(12) United States Patent
Iwata et al.

(10) Patent No.: US 8,877,104 B2
(45) Date of Patent: Nov. 4, 2014

(54) METHOD AND APPARATUS FOR PRODUCING OPTICAL MULTILAYER BODY

(75) Inventors: Yukimitsu Iwata, Aioi (JP); Koichi Mikami, Okayama (JP); Yoshihiro Nishimura, Okayama (JP); Takashi Kodama, Okayama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 429 days.

(21) Appl. No.: 11/884,394

(22) PCT Filed: Feb. 21, 2006

(86) PCT No.: PCT/JP2006/303058
§ 371 (c)(1), (2), (4) Date: Mar. 27, 2008

(87) PCT Pub. No.: WO2006/088203
PCT Pub. Date: Aug. 24, 2006

(65) Prior Publication Data
US 2008/0218865 A1 Sep. 11, 2008

(30) Foreign Application Priority Data
Feb. 21, 2005 (JP) .................... 2005-044231
Mar. 29, 2005 (JP) .................... 2005-095835

(51) Int. Cl.
B05D 5/06 (2006.01)
G02B 1/11 (2006.01)
G02F 1/1335 (2006.01)

(52) U.S. Cl.
CPC .......... G02B 1/111 (2013.01); G02F 1/133502 (2013.01)
USPC .............. 264/1.7; 264/1.9; 264/2.7; 264/131; 264/259; 264/284; 264/293

(58) Field of Classification Search
USPC ............ 264/1.7, 1.9, 2.7, 131, 259, 284, 293
See application file for complete search history.

(56) References Cited

U.S. PATENT DOCUMENTS
5,076,976 A * 12/1991 Aoki et al. ............ 264/484
6,696,140 B2 2/2004 Suzuki
(Continued)

FOREIGN PATENT DOCUMENTS
JP 64-019301 1/1989
JP 02-067129 A 3/1990
(Continued)

OTHER PUBLICATIONS
Excerpt from JIS B 0601 and JIS B 0031 (Both 1994).*
(Continued)

Primary Examiner — Timothy Kennedy
(74) Attorney, Agent, or Firm — Burr & Brown, PLLC

(57) ABSTRACT

An optical laminate produced by a process for producing an anti-dazzling laminate comprising a light transparent base material and an anti-dazzling layer provided on the light transparent base material. The process includes providing the light transparent base material and forming the anti-dazzling layer having a concavoconvex shape on the light transparent base material, wherein the concavoconvex shape of the anti-dazzling layer satisfies the following requirements: Sm is not less than 100 μm and not more than 600 μm, θa is not less than 0.1 degree and not more than 1.2 degrees, and Rz is more than 0.2 μm and not more than 1 μm, wherein Sm represents the average spacing of concavoconvexes or profile irregularities in the anti-dazzling layer; θa represents the average inclination angle of the concavoconvexes or profile irregularities; and Rz represents the average roughness of the concavoconvexes or profile irregularities.

15 Claims, 7 Drawing Sheets

(56) References Cited

U.S. PATENT DOCUMENTS

| | | | |
|---|---|---|---|
| 6,731,363 | B2 | 5/2004 | Nakamura et al. |
| 7,033,638 | B2 | 4/2006 | Suzuki |
| 7,128,428 | B2 | 10/2006 | Takahashi et al. |
| 7,542,207 | B2 | 6/2009 | Matsunaga |
| 2002/0122257 | A1 | 9/2002 | Suga et al. |
| 2003/0068513 | A1* | 4/2003 | Kubota et al. ............ 428/500 |
| 2003/0118750 | A1 | 6/2003 | Bourdelais et al. |
| 2003/0134975 | A1* | 7/2003 | Jordens et al. ............ 525/64 |
| 2004/0196558 | A1 | 10/2004 | Takahashi et al. |
| 2004/0223220 | A1 | 11/2004 | Kawanishi et al. |
| 2004/0240070 | A1* | 12/2004 | Suzuki et al. ............ 359/599 |
| 2005/0030444 | A1 | 2/2005 | Fujiwara et al. |
| 2005/0053729 | A1 | 3/2005 | Bourdelais et al. |
| 2005/0255291 | A1* | 11/2005 | Iwata et al. ............ 428/141 |
| 2006/0159902 | A1 | 7/2006 | Suzuki |
| 2007/0026167 | A1 | 2/2007 | Bourdelais et al. |

FOREIGN PATENT DOCUMENTS

| | | | |
|---|---|---|---|
| JP | 03-251451 A | 11/1991 | |
| JP | 07-294708 | 11/1995 | |
| JP | 09-193333 A1 | 7/1997 | |
| JP | 10-054901 | 2/1998 | |
| JP | 10-325901 | 12/1998 | |
| JP | 11-281818 | 10/1999 | |
| JP | 2000-206317 A1 | 7/2000 | |
| JP | 2000-215720 A1 | 8/2000 | |
| JP | 2000-338310 A1 | 12/2000 | |
| JP | 2000-352607 A | 12/2000 | |
| JP | 2001-233611 | 8/2001 | |
| JP | 2002-189106 | 7/2002 | |
| JP | 2002-189107 A1 | 7/2002 | |
| JP | 2002-202402 | 7/2002 | |
| JP | 2002-260424 A | 9/2002 | |
| JP | 2002-267814 | 9/2002 | |
| JP | 2002-275391 | 9/2002 | |
| JP | 2002-277602 | 9/2002 | |
| JP | 2002-303708 | 10/2002 | |
| JP | 2002-311421 A1 | 10/2002 | |
| JP | 2002-328228 | 11/2002 | |
| JP | 2002-370302 | 12/2002 | |
| JP | 2003-004903 A1 | 1/2003 | |
| JP | 2003-098346 A | 4/2003 | |
| JP | 2003-195016 A1 | 7/2003 | |
| JP | 2003-222713 | 8/2003 | |
| JP | 2003-240922 | 8/2003 | |
| JP | 2003-248110 | 9/2003 | |
| JP | 2004-046258 A | 2/2004 | |
| JP | 2004-050607 A1 | 2/2004 | |
| JP | 2004-061853 A1 | 2/2004 | |
| JP | 2004-126495 | 4/2004 | |
| JP | 2004-271642 | 9/2004 | |
| JP | 2004-271735 | 9/2004 | |
| JP | 2004-306328 | 11/2004 | |
| JP | 2004-322566 A1 | 11/2004 | |
| JP | 2004-333976 | 11/2004 | |
| JP | 2004-341070 A1 | 12/2004 | |
| JP | 2005-010509 A | 1/2005 | |
| JP | 2005-024885 A1 | 1/2005 | |
| JP | 2005-043572 A | 2/2005 | |
| JP | 2005-195819 A | 7/2005 | |
| TW | 351728 | 2/1999 | |
| TW | 200407568 | 5/2004 | |
| WO | 95/31737 | 11/1995 | |
| WO | WO 2004/070436 A | 8/2004 | |

OTHER PUBLICATIONS

Taiwanese Office Action dated Jan. 14, 2013 (with English translation).

Korean Office Action, Korean Application No. 10-2007-7021523, dated Feb. 29, 2012 (9 pages).

Japanese Office Action, Japanese Patent Application No. 2007-503784, dated Apr. 3, 2012 (10 pages).

Japanese Office Action, Japanese Patent Application No. 2007-503785, dated Apr. 3, 2012 (11 pages).

Japanese Office Action, Japanese Patent Application No. 2007-503786, dated Apr. 3, 2012 (16 pages).

Japanese Office Action, Japanese Patent Application No. 2007-503787, dated Apr. 3, 2012 (7 pages).

Japanese Office Action, Japanese Patent Application No. 2007-503788, dated Apr. 3, 2012 (7 pages).

Japanese Office Action, Japanese Patent Application No. 2011-258153, dated Mar. 8, 2013 (4 pages).

Korean Office Action, Korean Application No. 10-2007-7021631, dated Jan. 31, 2012 (8 pages).

Japanese Patent Application 2007-503784 Office Action dated Nov. 2, 2012 (with English translation).

Japanese Patent Application 2007-503785 Office Action dated Nov. 2, 2012 (with English translation).

Japanese Patent Application 2007-503786 Office Action dated Nov. 2, 2012 (with English translation).

Japanese Patent Application 2007-503787 Office Action dated Nov. 2, 2012 (with English translation).

Japanese Office Action (With English Translation), Japanese Application No. 2011-258120, dated May 21, 2013 (11 pages).

Japanese Office Action (With English Translation), Japanese Application No. 2011-258138, dated May 21, 2013 (11 pages).

Japanese Office Action (With English Translation), Japanese Application No. 2011-258146, dated May 21, 2013 (12 pages).

Japanese Office Action (With English Translation), Japanese Application No. 2011-258164, dated May 21, 2013 (11 pages).

* cited by examiner

AG

AG1

X:10 μm/div
Z:2000nm/div

METHOD AND APPARATUS FOR PRODUCING OPTICAL MULTILAYER BODY

CROSS-REFERENCE TO RELATED APPLICATIONS

This application is based upon and claims the benefit of priority from the prior Japanese Patent Applications No. 44231/2005 and No. 95835/2005 under the Paris Convention, and, thus, the entire contents thereof are incorporated herein by reference.

FIELD OF THE INVENTION

The present invention provides a process and apparatus for producing an optical laminate for use in displays such as CRTs and liquid crystal panels.

BACKGROUND OF THE INVENTION

The prevention of lowered contrast and lowered visibility caused by external light reflection or image reflection is required of image display devices, for example, cathode-ray tube display devices (CRTs), plasma displays (PDPs), electroluminescent displays (ELDs), or liquid crystal displays (LCDs). Accordingly, it is common practice to provide a reflection preventive laminate on the outermost surface of an image display device from the viewpoint of reducing image reflection or reflectance using the principle of light scattering or the principle of optical interference.

In image display devices, for example, liquid crystal displays, the use of an anti-dazzling laminate as one of antireflection laminates has hitherto been known for realizing regulating optical properties to realize excellent image displays. The anti-dazzling laminate is utilized for preventing a lowering in visibility as a result of external light reflection or image reflection within image display devices. The anti-dazzling laminate is generally realized by forming an anti-dazzling layer having a concavoconvex shape on a base material. In conventional image display devices, for example, liquid crystal displays, the use of an anti-dazzling laminate as one antireflection laminate has hitherto been known for regulating optical properties to realize excellent image display. The anti-dazzling laminate is utilized for preventing a lowering in visibility as a result of external light reflection or image reflection within image display devices. The anti-dazzling laminate is produced as having a concavoconvex shape obtained by curing a composition containing various particles, or having a concavoconvex shape formed by embossing (Japanese Patent Laid-Open No. 341070/2004).

In recent years, a demand for a higher level of definition of panel resolution has led to a higher level of fineness of the concavoconcex shape of the anti-dazzling layer. Accordingly, a concavoconvex shape having a broad and large curve has been regarded as unsuitable for meeting a demand for higher definition in the anti-dazzling laminate having the above construction and thus have not been adopted. On the other hand, when increasing the fineness of the concavoconvex shape involved in higher definition of panel resolution can meet a demand for higher definition of the panel resolution. Regarding this technique, however, it has often been pointed out that, for example, external light is reflected from the display surface resulting in such a phenomenon that, for example, the image display surface is seen white (whitening), or lowered contrast. When the anti-dazzling laminate is used on the image display surface of notebook computers and the like, a certain level of satisfactory optical properties can be provided. When the light transmitted through the backside of backlight within a display is transmitted through the concavoconvex shape face of the anti-dazzling laminate formed on the outermost surface of the panel, however, the concavoconvex shape functions as fine lenses which disturb the displayed pixels and the like, that is, "glare" is likely to occur. This unfavorable phenomenon makes it difficult to attain the effect of the anti-dazzling laminate per se. In particular, the occurrence of the "glare" increases with increasing the definition of the panel resolution, and, thus, effectively preventing this unfavorable phenomenon has been desired.

In order to eliminate this "glare," for example, a method has been adopted in which surface concavoconvexes are densely provided to enhance the sharpness and, at the same time, scattering particles different from the resin for anti-dazzling layer formation in refractive index are added to impart internal scattering effect to the anti-dazzling laminate. All of proposed methods could satisfactorily solve the problem of the "glare," but on the other hand, they sometimes lowered the visibility of the whole image. On the other hand, in the anti-dazzling laminate, the method for reducing the "glare" in high-definition panels has been regarded as a main cause of an unfavorable phenomenon, for example, a deterioration in contrast such as clouding caused by surface whitening, internal scattering effect or the like. That is, it has been regarded that "glare prevention" and "contrast improvement" are in the relationship of tradeoff, and simultaneously meeting both the requirements is difficult. In the above methods, for example, black color reproduction including glossy black feeling (wet glossy black color) in on-screen display, contrast and the like have sometimes been poor. That is, gradation rendering of black color in a light room, particularly a black color gradation difference in low gradation, cannot be regarded without difficulties resulting in lowered sensitivity. Specifically, black and gray colors are only recognized as a blurred and identical color-tone black color. In particular, it can be said that an anti-dazzling laminate having better antiglare properties has a significantly lowered level of visibility.

Accordingly, at the present time, the development of a production process (and production apparatus) for an optical laminate, which can effectively prevent the glare of an image surface and, at the same time, can realize good black color reproduction, especially glossy black feeling, has been desired. In particular, a production process (and production apparatus) for an optical laminate, which can be used in liquid crystal displays (LCDs) as well as in other applications such as cathode ray tube display devices (CRTs), plasma displays (PDPs), fluorescent display tubes, and field emission-type displays.

SUMMARY OF THE INVENTION

At the time of the present invention, the present inventors have found a process and apparatus for producing an optical laminate which, while imparting anti-dazzling properties, can realize the so-called glossy black feeling (glossy black color) by improving the anti-glare property and the contrast, especially by improving black color reproduction. The present invention has been made based on such finding.

Accordingly, the present invention provides a process (and apparatus) for producing an optical laminate which can realize an anti-dazzling function and an excellent anti-glare property and, at the same time, can realize image display having a high level of visibility.

Production Process

According to the present invention, there is provided a process for producing an optical laminate comprising: a light transparent base material; and an anti-dazzling layer provided on the light transparent base material, the process comprising the steps of:

provided the light transparent base material; and forming the anti-dazzling layer having a concavoconvex shape on the light transparent base material, wherein the concavoconvex shape of the anti-dazzling layer satisfies the following requirements:

Sm is not less than 100 μm and not more than 600 μm,

θa is not less than 0.1 degree and not more than 1.2 degrees, and

Rz is more than 0.2 μm (preferably not less than 0.35 μm) and not more than 1 μm (preferably not more than 0.9 μm), wherein Sm represents the average spacing of concavoconvexes or profile irregularities in the anti-dazzling layer; θa represents the average inclination angle of the concavoconvexes (or profile irregularities); and Rz represents the average roughness of the concavoconvexes (or profile irregularities).

Production Apparatus

According to another aspect of the present invention, there is provided an apparatus for producing an optical laminate comprising: a light transparent base material and an anti-dazzling layer provided on the light transparent base material, the apparatus comprising:

a feed part for feeding the light transparent base material and the anti-dazzling layer having a concavoconvex shape; and a forming part for forming the anti-dazzling layer on the light transparent base material, wherein the concavoconvex shape of the anti-dazzling layer satisfies the following requirements:

Sm is not less than 100 μm and not more than 600 μm,

θa is not less than 0.1 degree and not more than 1.2 degrees, and

Rz is more than 0.2 μm (preferably not less than 0.35 μm) and not more than 1 μm (preferably not more than 0.9 μm), wherein Sm represents the average spacing of concavoconvexes or profile irregularities in the anti-dazzling layer; θa represents the average inclination angle of the concavoconvexes (or profile irregularities); and Rz represents the average roughness of the concavoconvexes (or profile irregularities).

The production process and production apparatus according to the present invention can provide an optical laminate which can realize excellent anti-dazzling properties and black color reproduction having glossy black feeling, can realize a high level of sharpness and excellent anti-glare property, contrast, and letter blurring preventive property, and can be used in various displays. In particular, the process for producing an optical laminate according to the present invention can provide an optical laminate which is significantly improved in black color gradation rendering (glossy black color reproduction), which could not have been realized by the conventional anti-dazzling laminate without difficulties. More specifically, it is possible to provide an optical laminate which, in an image in movie display, can render gradation substantially comparable with a conventional display provided with a laminate comprising a clear hard coat layer free from any concavoconvex shape and an antireflection layer provided on the clear hard coat layer and, at the same time, can realize a good sharpness of the contour of letters and can prevent scintillation. In a preferred embodiment of the present invention, the provision of an optional layer such as a surface modifying layer or a low-refractive index layer on the anti-dazzling layer means that the surface of the concavoconvex shape constituting the anti-dazzling layer is sealed by the optional layer, and, thus, a large and smooth desired concavoconvex shape can be realized. Further, various functions such as antistatic property, refractive index regulation, and contamination prevention can be imparted to the optical laminate. When an optional layer such as a surface modifying layer or a low-refractive index layer is provided on the anti-dazzling layer, the surface concavoconvex shape of the optional layer such as the surface modifying layer or the low-refractive index layer conforms to the optical property values of the surface concavoconvex shape of the anti-dazzling layer according to the present invention. That is, in the optical laminate according to the present invention, the concavoconvex shape of the outermost surface conforms to the optical property values of the surface concavoconvex shape of the anti-dazzling layer specified in the present invention.

DETAILED DESCRIPTION OF THE INVENTION

Definition

Figure 1:
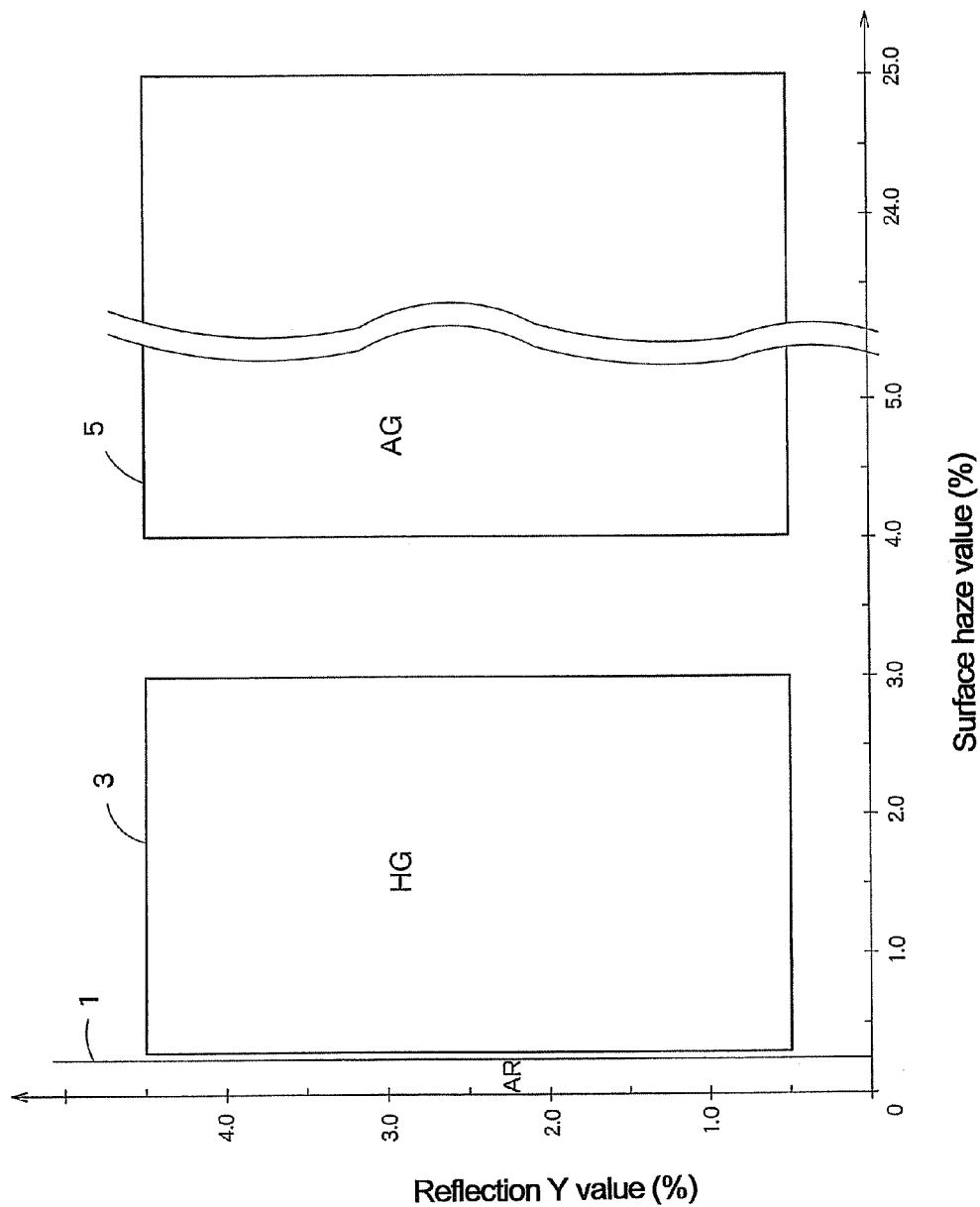
FIG. 1 is a graph showing the relationship between the reflection Y value and the surface haze value for an optical laminate.

Terms used in the present specification (working examples and the like) will be defined as follows.

1) Ten-Point Average Roughness (Rz)

The average roughness is measured by measuring the surface shape as a two-dimensional or three-dimensional profile. In fact, the measurement in this case is carried out under a scanning probe microscope or an atomic force microscope. It is generally difficult to objectively compare curves per se, and, hence, various roughness indexes are calculated based on the profile curve data. Accordingly, in the present invention, the ten-point average roughness (Rz) is calculated using the above measurement results and is expressed in terms of the sum of the average value of absolute values of the highest five deviation values and the average value of absolute values of the lowest five deviation values among deviation values determined from average values.

2) Average Spacing of Profile Irregularities (Concavoconvexes) Sm (μm) and Average Inclination Angle θa The anti-dazzling layer constituting the optical laminate according to the present invention has a concavoconvex shape. Sm (μm) represents the average spacing of concavoconvexes (profile irregularities) of the anti-dazzling layer, and θa (degree) represents the average inclination angle of the concavoconvex part. Sm (μm) and θa (degree) may be defined as described in an instruction manual (revised on Jul. 20, 1995) of a surface roughness measuring device (model: SE-3400, manufactured by Kosaka Laboratory Ltd.). θa (degree) represents the angle mode, and, when the inclination is Δa in terms of aspect ratio, θa (degree) is determined by θa (degree)=tan$^1$Δa=tan$^1$/(sum of values of difference between the lowest part and the highest part in each concavoconvex (corresponding to the height of each convex part)/reference length). The "reference length" is the same as in the following measuring conditions 1.

When the parameters (Sm, θa, and Rz) representing the surface roughness of the optical laminate according to the present invention may be measured, for example, with the above surface roughness measuring device under the following measurement conditions. This measuring method is favorable in the present invention.

Measuring Conditions

1) Tracer in Surface Roughness Detector:

Model/SE2555N (standard 2 μm), manufactured by Kosaka Laboratory Ltd. (radius of curvature in tip 2 μm/apex angle: 90 degrees/material: diamond)

2) Measuring Conditions for Surface Roughness Measuring Device:

Reference length (cut-off value of roughness curve λc): 2.5 mm

Evaluation length (reference length (cut-off value λc)×5): 12.5 mm

Feed speed of tracer: 0.5 mm/sec $$\psi=Rz/Sm$$

The ratio ψ between the average roughness Rz of concavoconvexes and the average spacing Sm of concavoconvexes is defined by ψ=Rz/Sm. The ratio between the average roughness Rz of concavoconvexes and the average spacing Sm of concavoconvexes can be used as an index for indicating the gradient of the inclination of the concavoconvexes. The ratio y between the average roughness Rz of concavoconvexes and the average spacing Sm of concavoconvexes is defined by y Rz/Sm. The ratio between the average roughness Rz of concavoconvexes and the average spacing Sm of concavoconvexes can be used as an index for indicating the tilt angle of the inclination of the concavoconvexes.

3) Reflection Y Value

The reflection Y value is a value indicating a luminous reflectance determined by measuring 5-degree regular reflectance in a wavelength range of 380 to 780 nm with a spectrophotometer MPC 3100 manufactured by Shimadzu Seisakusho Ltd. and then converting the reflectance values to lightness which can be perceived by the human eye with a software (incorporated in MPC 3100). The 5-degree regular reflectance is measured in such a state that, in order to prevent the backside reflection of the film as the optical laminate, a black tape (manufactured by Teraoka Seisakusho Co., Ltd.) is applied to the side remote from the film face to be measured.

4) Haze Value, Total Light Transmittance, 60-Degree Gloss, and Transmission Sharpness The haze value may be measured according to JIS K 7136. A reflection-transmittance meter HR-100 (Murakami Color Research Laboratory) may be mentioned as an instrument used for the measurement. The total light transmittance of the anti-dazzling laminate may be measured with the same measuring device as in the haze value according to JIS K 7361. The haze and total light transmittance are measured in such a state that the coated face is directed to a light source. The 60-degree gloss can be measured with a precision gloss meter (GM-26D, manufactured by Murakami Color Research Laboratory) according to JIS Z 8741. The 60-degree gloss is measured in such a state that, in order to eliminate the influence of backside reflection of a sample, a double face adhesive tape (manufactured by Teraoka Seisakusho Co., Ltd.) is applied to the backside of a sample and a black lid of the measuring device. The transmission sharpness is expressed in terms of the total of numerical values obtained by measurement with four types of optical combs (0.125 mm, 0.5 mm, 1 mm, and 2 mm) with an image clarity measuring device (stock number; "ICM-IDP", manufactured by Suga Test Instruments Co., Ltd.) according to JIS K 7105.

5) Definition of Surface Haze

The term "surface haze" as used herein is determined as follows. A pentaerythritol triacrylate or other resin (including resin components such as monomers or oligomers) is diluted with toluene or the like to a solid content of 60%, and the diluted solution is coated with a wire bar onto concavoconvexes of the anti-dazzling layer to a thickness on a dry film basis of 8 μm, whereby the surface concavoconvexes of the anti-dazzling layer are rendered flat. In this case, when the recoating agent is likely to be repelled and less likely to wet the anti-dazzling layer due to the presence of a leveling agent in the composition for anti-dazzling layer formation, a method may be adopted in which the anti-dazzling film is previously rendered hydrophilic by saponification. The saponification is carried out by immersing the anti-dazzling film in a 2 mol/liter NaOH (or KOH) solution (55° C.) for 3 min, washing the film with water, completely removing water droplets with a Kimwipe, and then drying the film in an oven (50° C.) for one min. The film having a flattened surface does not have any haze derived from surface concavoconvexes but has only an internal haze. This haze can be determined as an internal haze. The value obtained by subtracting the internal haze from the original film haze (overall haze) is determined as a haze (a surface haze) attributable only to surface concavoconvexes.

6) Thickness of Anti-Dazzling Layer

The thickness of the anti-dazzling layer refers to a part extended from the interface, between the base material on its display surface side and the outermost surface of the anti-dazzling concavoconvex in contact with the air. In the part extended from the base material surface to the outermost surface, the anti-dazzling layer has either a single layer or a multilayer structure comprising a surface modifying layer and other optical function layers stacked onto the anti-dazzling layer.

Method for Measuring Layer Thickness

The cross section of the optical laminate was subjected to transmission observation under a confocal laser microscope (LeicaTCS-NT, manufactured by Leica: magnification "100 to 300 times) to determine whether or not the interface was present, and the results were evaluated according to the following criteria. Specifically, in order to provide a halation-free sharp image, a wet objective lens was used in a confocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear.

Measurement Procedure

1: The average thickness of the layer was measured by observation under a laser microscope.

2: The measurement was carried out under the following conditions.

3: For one image plane, the layer thickness from the base material to the maximum profile peak (convex) part was measured for one point, and the layer thickness from the base material to the minimum valley (concave) part was measured for one point. That is, the layer thickness was measured for two points in total for one image plane. This measurement was carried out for five image planes, that is, 10 points in total, and the average value was determined.

Production Process

The concavoconvex shape of the anti-dazzling layer formed by the production process according to the present invention is formed as having optical properties which will be described later in connection with "optical laminate." In an embodiment of the present invention, the anti-dazzling layer in the optical laminate produced by the process according to the present invention satisfies the following requirements:

Sm is not less than 100 μm and not more than 600 μm,

θa is not less than 0.1 degree and not more than 1.2 degrees, and

Rz is more than 0.2 μm and not more than 1 μm, wherein Sm represents the average spacing of concavoconvexes (or profile irregularities) in the anti-dazzling layer; θa represents the average inclination angle of the concavoconvexes (or profile irregularities); and Rz represents the average roughness of the concavoconvexes (or profile irregularities).

First Production Process

According to the present invention, there is provided a first process for producing an optical laminate comprising: a light transparent base material; and an anti-dazzling layer provided on the light transparent base material, the process comprising the steps of:

providing the light transparent base material; and forming the anti-dazzling layer having a concavoconvex shape on the light transparent base material.

Figure 3:
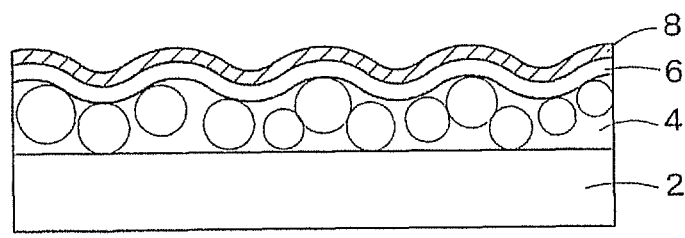
FIG. 3 is a diagram showing a production process of an optical laminate according to the present invention.

The production process of an optical laminate (HG) according to the present invention will be described with reference to FIG. 3. FIG. 3 is a cross-sectional view of an optical laminate according to the present invention. In the production process of present invention, a light transparent base material 2 is first provided. Next, an anti-dazzling layer 4 is formed on the upper surface of the light transparent base material 2 to produce the optical laminate. In the present invention, various methods for anti-dazzling layer formation can be utilized. Preferred methods are as follows.

Second Production Process

The second production process according to the present invention is the same as the first production process of the present invention, except that an anti-dazzling layer on which a concavoconvex shape has been previously formed is provided on the light transparent base material. The second production process may be described in more detail with reference to FIG. 3. Specifically, an anti-dazzling layer 4 on which a concavoconvex shape has been previously formed is provided on a light transparent base material 1. Preferably, the anti-dazzling layer 4 is formed with the aid of an easy-adhesion layer such as an adhesive agent (layer) or a primer. Alternatively, a method may also be adopted in which a previously formed anti-dazzling layer is formed onto the upper surface of the light transparent base material 2 through an adhesive (agent) layer and the adhesive (agent) layer is then subjected to curing or the like.

Third Production Process

The third production process according to the present invention is the same as the first production process of the present invention, except that an anti-dazzling layer is formed on the light transparent base material and a concavoconvex shape is formed on the surface of the anti-dazzling layer. In a preferred embodiment of the present invention, the concavoconvex shape is formed by embossing treatment using a mold having a reversed concavoconvex shape in relation to the concavoconvex shape in the anti-dazzling layer. The concavoconvex shape formation may be described in detail with reference to FIG. 3. Specifically, an anti-dazzling layer 4 having a concavoconvex shape can be formed by forming an anti-dazzling layer on a light transparent base material 1 and then forming a concavoconvex shape on the surface of the anti-dazzling layer. In a preferred embodiment of the present invention, the concavoconvex shape may be formed in the anti-dazzling layer 4 by using a mold having a reversed concavoconvex shape in relation to the concavoconvex shape in the anti-dazzling layer 4. The anti-dazzling layer 4 per se may be formed in the same manner as in the second production process.

Fourth Production Process

The fourth production process according to the present invention is the same as the first production process according to the present invention, except that a composition for an anti-dazzling layer is applied onto the light transparent base material to form the above anti-dazzling layer having a concavoconvex shape. In a preferred embodiment of the present invention, for example, a method may be adopted in which the composition for an anti-dazzling layer is subjected to curing or the like in the formation of the anti-dazzling layer having a concavoconvex shape. In FIG. 3, the anti-dazzling layer 4 contains a resin and fine particles. The fine particles may be those having an identical shape or average particle diameter or the same or different shape or average particle diameter, or may be aggregation-type fine particles. On the other hand, in the present invention, the anti-dazzling layer may also be formed by using a polymer or resin only. The details of the method for anti-dazzling layer 4 formation may be the same as described below in connection with "anti-dazzling layer."

Fifth Production Process

The fifth production process is a process for producing an optical laminate, comprising: a light transparent base material; and an anti-dazzling layer provided on the light transparent base material, the process comprising the steps of:

providing the light transparent base material;

introducing the light transparent base material into a mold having a reversed concavoconvex shape in relation to the concavoconvex shape of the surface of the anti-dazzling layer; and applying a composition for an anti-dazzling layer to the mold to form an anti-dazzling layer having a concavoconvex shape on the light transparent base material.

Optional Process

In a preferred embodiment of the present invention, there is also provided a production process in which a surface modifying layer 6 is formed on an anti-dazzling layer 4. In a more preferred embodiment of the present invention, in an optical laminate to be disposed on the outermost surface of a display device, lowering the reflection (a reduction in reflectance) of the optical laminate utilizing the principle of optical interferences is preferred from the viewpoint of preventing, for example, contrast deterioration or visibility deterioration by external light reflection or image reflection. For example, there is proposed a production process in which a low-refractive index layer 8 having a lower refractive index than the refractive index of the anti-dazzling layer 4 or the surface modifying layer 6 is formed on the surface of the surface modifying layer 6.

Production Apparatus

The concavoconvex shape of the anti-dazzling layer formed by the production apparatus according to the present invention is formed as having optical properties which will be described later in connection with "optical laminate." In a preferred embodiment of the present invention, the concavoconvex shape of the anti-dazzling layer in the optical laminate produced by the production apparatus according to the present invention satisfies the following requirements:

Sm is not less than 100 μm and not more than 600 μm,
θa is not less than 0.1 degree and not more than 1.2 degrees, and
Rz is more than 0.2 μm and not more than 1 μm, wherein Sm represents the average spacing of concavoconvexes or profile irregularities in the anti-dazzling layer; θa represents the average inclination angle of the concavoconvexes (or profile irregularities); and Rz represents the average roughness of the concavoconvexes (or profile irregularities).

First Production Apparatus

The first production apparatus according to the present invention is an apparatus for producing an optical laminate comprising a light transparent base material and an anti-dazzling layer provided on the light transparent base material, the apparatus comprising:

a feed part for feeding the light transparent base material and the anti-dazzling layer having a concavoconvex shape; and a forming part for forming the anti-dazzling layer on the light transparent base material.

Figure 4:
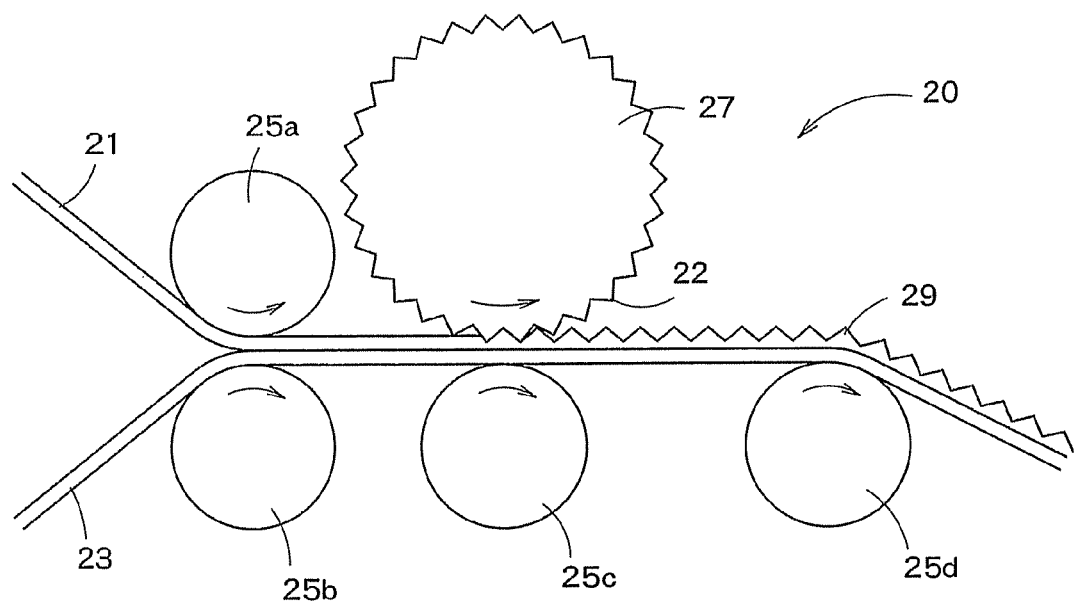
FIG. 4 is a schematic diagram showing a production apparatus according to the present invention.

Any schematic diagram of this apparatus is not specifically shown, and the construction of the first production apparatus may be the same as that of the second production apparatus, described below, the first embodiment of which is schematically shown in FIG. 4, except that a roller emboss 27 and a roller 25c are not provided.

Second Production Apparatus

The second production apparatus according to the present invention is an apparatus for producing an optical laminate comprising a light transparent base material and an anti-dazzling layer provided on the light transparent base material, the apparatus comprising:

a feed part for feeding the light transparent base material and the anti-dazzling layer; and a forming part for forming the anti-dazzling layer on the light transparent base material and forming a concavoconvex shape in the anti-dazzling layer.

The second production apparatus will be briefly described with reference to FIG. 4. FIG. 4 is a schematic diagram of the second production apparatus according to the present invention. A light transparent base material 21 is fed through a roller 25a as a feed part, and an anti-dazzling layer (free from a concavoconvex shape) 23 is fed through a roller 25b as the feed part. The fed light transparent base material 21 and anti-dazzling layer 23 are integrated with each other by the roller 25a and the roller 25b. In a preferred embodiment of the present invention, a feed part for feeding an adhesive agent (layer) may be provided. In this case, the light transparent base material 21 and the anti-dazzling layer 23 are integrated with each other through the adhesive agent (layer) fed from the feed part. The integrated light transparent base material 21 and anti-dazzling layer 23 are introduced into a roller emboss 27 having a reversed concavoconvex shape 22 in relation to the concavoconvex shape to be imparted to the anti-dazzling layer. The integrated light transparent base material 21 and anti-dazzling layer 23 is held between the roller emboss 27 and the roller 25c to form a desired concavoconvex shape in the anti-dazzling layer 23 and thus to form an optical laminate 29. The optical laminate 29 thus formed is supplied as a product through a roller 25d.

In a preferred embodiment of the present invention, the forming part comprises a mold having a reversed concavoconvex shape in relation to the concavoconvex shape in the anti-dazzling layer. Besides the roller emboss 27, a flat-type emboss plate may be used. Emboss treatment methods, roller emboss, flat-type emboss plates and the like may be the same as described below in connection with the fourth production apparatus according to the present invention.

Third Production Apparatus

The third production apparatus according to the present invention is an apparatus for producing an optical laminate comprising a light transparent base material and an anti-dazzling layer provided on the light transparent base material, the apparatus comprising:

a feed part for feeding the light transparent base material;

an application part for applying a composition for an anti-dazzling layer on the light transparent base material; and a forming part for curing the composition for an anti-dazzling layer to form the anti-dazzling layer having a concavoconvex shape.

Figure 5:
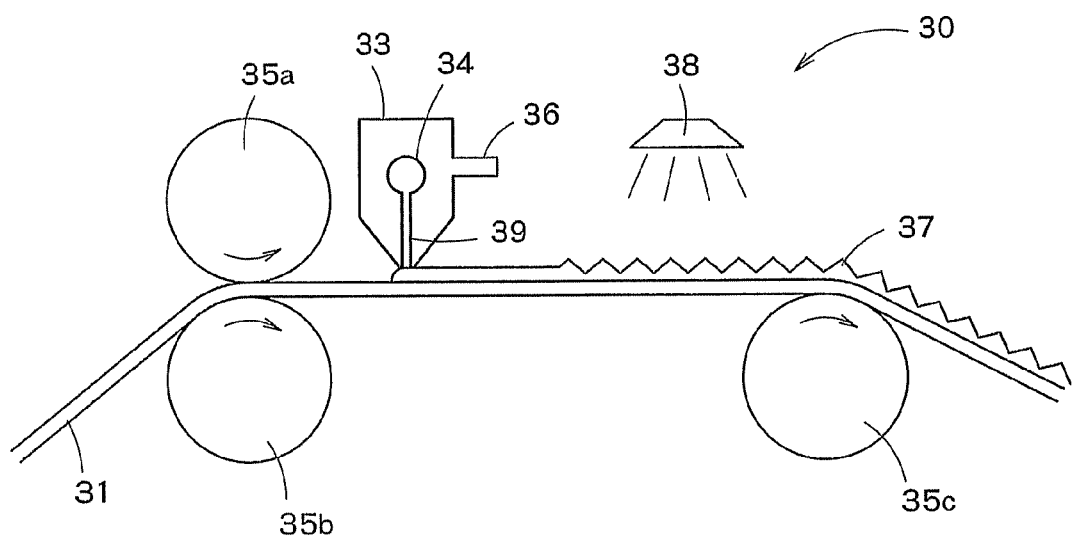
FIG. 5 is a schematic diagram showing a production apparatus according to the present invention.

The third production apparatus according to the present invention will be briefly described with reference to FIG. 5. FIG. 5 is a schematic diagram of the third production apparatus according to the present invention. A light transparent base material 31 is held between rollers 35a and 35b as the feed part and is fed. A coating head 33 is provided behind the rollers 35a and 35b as the feed part, and a composition 34 for an anti-dazzling layer is fed from a liquid reservoir through a pipe 36. The fed composition 34 for an anti-dazzling layer is fed through a slit 39 open toward the lower part of the coating head 33. The composition 34 for an anti-dazzling layer is applied through the slit 39 onto the fed light transparent base material 31 to form a layer of the composition 34 for an anti-dazzling layer. Thereafter, curing treatment is carried out by a curing device 38 provided behind the coating head 33, whereby the composition 34 for an anti-dazzling layer is cured to form a desired concavoconvex shape on the anti-dazzling layer 37. The optical laminate comprising the cured anti-dazzling layer 37 provided on the light transparent base material 41 is moved and passed through a roller 25d to produce an optical laminate.

Fourth Production Apparatus

The fourth production apparatus according to the present invention is an apparatus for producing an optical laminate comprising a light transparent base material and an anti-dazzling layer provided on the light transparent base material, the apparatus comprising:

a feed part for feeding the light transparent base material;

a mold having a reversed concavoconvex shape in relation to the concavoconvex shape of the surface of the anti-dazzling layer provided on the light transparent base material;

an introduction part for introducing the composition for an anti-dazzling layer into the mold; and a forming part for curing the composition for an anti-dazzling layer to form the anti-dazzling layer having a concavoconvex shape.

Figure 6:
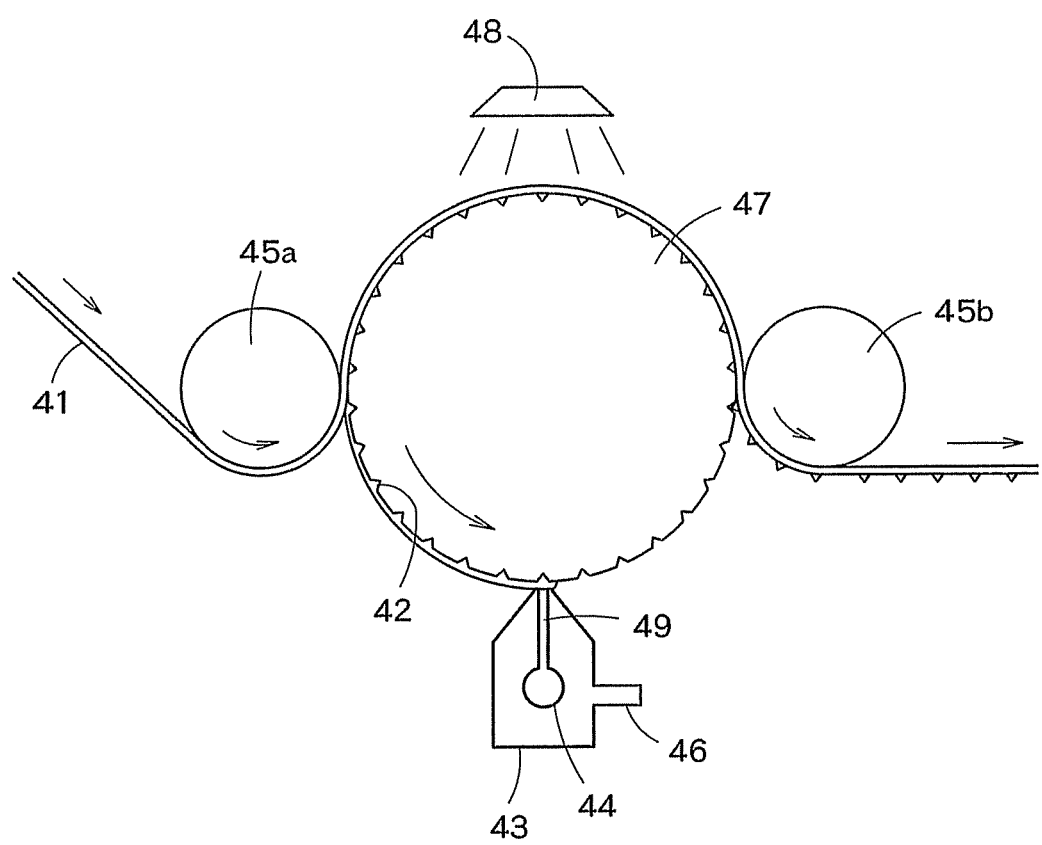
FIG. 6 is a schematic diagram showing a production apparatus according to the present invention.

One embodiment of the fourth production apparatus will be briefly described with reference to FIG. 6. FIG. 6 is a schematic diagram of the fourth production apparatus (embossing apparatus 40) according to the present invention. A light transparent base material 41 is fed to an emboss roller 47 through a nip roller 45a as the feed part. A reversed concavoconvex shape 42 in relation to the desired concavoconvex shape of the anti-dazzling layer is provided on the surface of the emboss roller 47. A coating head 43 is provided on the lower part of the emboss roller 47, and an a composition 44 for an anti-dazzling layer is fed through a pipe 46 from a liquid reservoir (not shown). The fed composition 44 for an anti-dazzling layer is fed through a slit 49 open toward the upper part of the coating head 43. The composition 44 for an anti-dazzling layer is applied to the emboss roller 47 on its surface having a concavoconvex shape 42. The emboss roller 47 is then rotated (in a direction indicated by an arrow in the drawing). Consequently, the light transparent base material 41 and the composition 44 for an anti-dazzling layer are brought into intimate contact with each other between the concavoconvex shape 42 in the emboss roller 47 and the nip roller 45a as the feed part. In a preferred embodiment of the present invention, instead of the formation of the light transparent base material 41 after the application of the composition 44 for an anti-dazzling layer onto the concavoconvex shape 42, a method may be adopted in which, while winding the light transparent base material 41 around the emboss roller 47, the composition 44 for an anti-dazzling layer is fed into between the light transparent base material 41 and the emboss roller 47 to bring the light transparent base material 41 and the layer of the composition 44 for an anti-dazzling layer into contact with each other. The assembly in which the light transparent base material 41 and the layer of the composition 44 for an anti-dazzling layer have been brought into intimate contact with each other is moved onto the upper part of the emboss roller 47, and curing treatment is carried out by a curing device 48 provided above the emboss roller 47, whereby the layer of the composition 44 for an anti-dazzling layer is cured and integrated with the upper part of the light transparent base material 41. The optical laminate comprising the cured layer of the composition 44 for an anti-dazzling layer provided on the light transparent base material 41 is moved upon the rotation of the emboss roller 47 and is separated from the emboss roller 47 by a peel-off roller 45b to produce an optical laminate comprising an anti-dazzling layer having a concavoconvex shape.

Embossing

The fourth production apparatus according to the present invention is advantageous in that an optical laminate provided with an anti-dazzling layer having a desired concavoconvex shape formed without incorporating fine particles can be produced. In the present invention, the concavoconvex shape may be formed by an emboss method in which a formed anti-dazzling layer or an anti-dazzling layer which is in the course of formation thereof is embossed by an emboss plate (preferably a roller emboss), and, if necessary, curing treatment is carried out, for example, by heating. In a preferred embodiment of the present invention, a method is adopted which comprises providing a concavoconvex mold having a surface with a reversed concavoconvex shape in relation to the desired concavoconvex shape, applying a composition, for an anti-dazzling layer, having a high level of curability onto the light transparent base material, and then subjecting the assembly to curing to integrate the light transparent base material with the anti-dazzling layer having a concavoconvex shape and thus to produce an optical laminate. In the present invention, a method may be adopted in which a composition for an anti-dazzling layer is first applied followed by embossing with a mold having a concavoconvex mold shape. Alternatively, a method may also be adopted in which a composition for an anti-dazzling layer is supplied to the interface of a light transparent base material and a mold having a concavoconvex shape to allow the composition for an anti-dazzling layer to be interposed between the mold having a concavoconvex shape and the light transparent base material and to the formation of the concavoconvex shape and the formation of the anti-dazzling layer simultaneously. In a preferred embodiment of the present invention, in addition to the emboss roller, a flat emboss plate may also be used.

The mold surface having a concavoconvex shape formed, for example, in an emboss roller or a flat emboss plate may be formed by various methods, specifically by a sandblasting method or a bead shot method. The anti-dazzling layer formed using an emboss plate (an emboss roller) formed by the sandblast method has such a shape that a number of concaves (on the other hand, downward convexed cross section) are distributed on the upper side. On the other hand, the anti-dazzling layer formed using an emboss plate (an emboss roller) formed by the bead shot method has such a shape that a number of convexes (on the other hand, upward convexed cross section) are distributed on the upper side.

When the average roughness of concavoconvexes formed on the surface of the anti-dazzling layer is identical, the anti-dazzling layer in which a number of convexes are distributed on its upper side is regarded as causing a lower level of reflection of a lighting equipment in a room or the like as compared with the anti-dazzling layer in which a number of concaves are distributed on its upper side. Accordingly, in a preferred embodiment of the present invention, the concavoconvex shape of the anti-dazzling layer is formed by utilizing a concavoconvex mold having a shape identical to the concavoconvex shape of the anti-dazzling layer by a bead shot method. The concavoconvex shape formed by this concavoconvex mold is such that the proportion of the upward convexed cross-sectional shape part is larger than that of the downward convexed cross-sectional shape part. In another preferred embodiment of the present invention, the concavoconvex shape of the anti-dazzling layer is formed by utilizing a concavoconvex mold having a shape, which is reverse to the concavoconvex shape of the anti-dazzling layer, formed by the bead shot method. The concavoconvex shape formed by this concavoconvex mold is such that the proportion of the downward convexed cross-sectional shape (that is, concave) part is larger than that of the upward convexed cross-sectional shape (that is, convex) part.

Mold materials for forming the concavoconvex mold face usable herein include metals, plastics, woods, or composites thereof. Example of preferred mold materials in the present invention are chromium as a metal from the viewpoints of strength and abrasion resistance upon repeated use, and are iron emboss plates (emboss rollers) having a surface plated with chromium, for example, from the viewpoints of cost effectiveness.

Specific examples of particles (beads) sprayed in the formation of the concavoconvex mold by the sandblast or bead shot method include inorganic particles such as metal particles, silica, alumina, or glass. The particle size (diameter) of these particles is preferably about 100 μm to 300 μm. In spraying these particles against the mold material, a method may be adopted in which these particles, together with a high speed gas, are sprayed. In this case, a proper liquid, for example, water or the like may be used in combination with the particles. In the present invention, preferably, the concavoconvex mold having a concavoconvex shape is plated with chromium or the like to improve the durability during use of the mold and is preferred from the viewpoints of film hardening and corrosion prevention.

Optical Laminate

The optical laminate according to the present invention simultaneously has anti-dazzling properties and excellent black color reproduction and contrast. In the present invention, the optical laminate is referred to as a half glare optical laminate (HG). HG has both properties of a conventional anti-glare optical laminate (AG) having excellent anti-dazzling properties and properties of an optical laminate (AR) comprising a clear hard coat (glare) layer provided with a low-refractive index layer and having excellent black color reproduction and contrast. Specifically, the provision of a surface modifying layer considered as one of methods for half glare optical laminate (HG) formation on the anti-glare optical laminate (AG) renders the concavoconvex shape of the anti-dazzling layer smooth, and, further, imparting a surface roughness parameter similar to the anti-glare (AG) can realize the production of an anti-dazzling laminate having a very high level of glossy black feeling while imparting satisfactory anti-dazzling properties. Accordingly, the details of the optical laminate (HG) according to the present invention will be described while comparing the conventional AR and AG.

FIG. 1 is a diagram showing the relationship between the surface haze value (%) and the reflection Y value (%) in the optical laminate. In FIG. 1, the conventional AR belongs to an area in which the surface haze value is less than about 0.3%, specifically an area on the left side from the ruled line indicated by a reference numeral 1. On the other hand, the conventional AG belongs to an area where the surface haze value is approximately 4.0% to 25.0% (generally not less than 10.0%) and the reflection Y value is approximately 1.0 to 4.5, specifically an area surrounded by a reference numeral 5 (generally a right side area in the area surrounded by the reference numeral 5). On the other hand, the optical laminate (HG) according to the present invention belongs to an area where the surface haze value is approximately not less than 0.2% and not more than 3.5% (preferably not more than 3.0) and the reflection Y value is approximately not less than 0.5 and not more than 4.5, specifically an area surrounded by a reference numeral 3.

Figure 2:
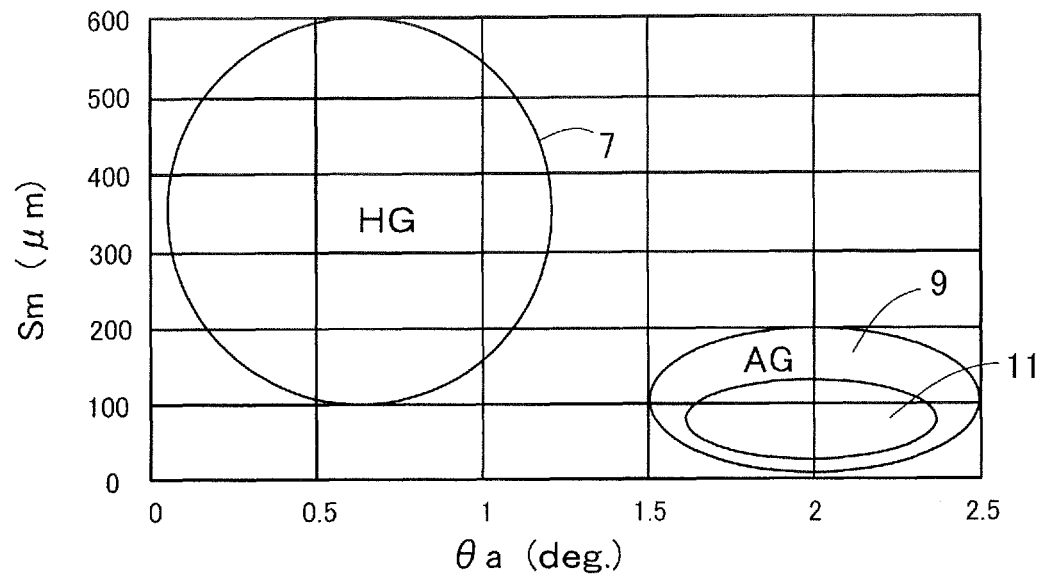
FIG. 2 is a graph showing the relationship between θa and Sm for an optical laminate.

The optical properties of the optical laminate produced by the production process according to the present invention will be described with reference to FIG. 2. FIG. 2 is a diagram showing the relationship between the average inclination angle θa (in degree) in the concavoconvexes part of the anti-dazzling layer in the optical laminate and the average spacing Sm (μm) of the concavoconvexes. As can be seen from FIG. 2, in the conventional AG, specifically, AG having a θa value of not less than 1.5 degrees and not more than 2.5 degrees and an Sm value of approximately more than 30 μm and not more than 200 μm (an area indicated by a reference numeral 9), that is, one falling within the area indicated by a reference numeral 11, has been regarded as a preferred AG. On the other hand, in the optical laminate (HG) according to the present invention, the θa value is more than 0.1 degree and not more than 1.2 degrees. Preferably, the lower limit of the θa value is 0.3 degree, and the upper limit of the θa value is 0.6 degree. The Sm value is approximately not less than 100 μm and not more than 600 μm. Preferably, the lower limit of the Sm value is 120 μm, and the upper limit of the Sm value is 400 μm. Specifically, an optical laminate falling within an area indicated by a reference numeral 7 is utilized. The Rz value of the optical laminate according to the present invention is more than 0.2 μm (preferably not less than 0.35 μm) and not more than 1.2 μm (preferably not more than 1 μm, more preferably not more than 0.9 μm).

1. Anti-Dazzling Layer

In the production process according to the present invention, the anti-dazzling layer may be formed, for example, by stacking a previously formed anti-dazzling layer onto the surface of the optical laminate. Additional methods for forming the anti-dazzling layer on the surface of the optical laminate in the present invention include 1) a method in which an anti-dazzling layer having a concavoconvex shape is formed using a composition for an anti-dazzling layer comprising fine particles added to a resin, 2) a method in which an anti-dazzling layer having a concavoconvex shape is formed using a composition for an anti-dazzling layer containing only a resin or the like without the addition of fine particles, and 3) a method in which an anti-dazzling layer is formed by using treatment for forming a concavoconvex shape. In the present invention, when an anti-dazzling layer is previously formed, the anti-dazzling layer may be one formed by any one of the above methods 1) to 3).

The thickness H μm of the anti-dazzling layer formed by the production process according to the present invention is not less than 0.5 μm and not more than 27 μm (preferably not more than 12 μm). Preferably, the lower limit of the thickness of the anti-dazzling layer is 1 μm, and the upper limit of the thickness of the anti-dazzling layer is 7 μm.

Method for Anti-Dazzling Layer Formation Using Composition for Anti-Dazzling Layer, Comprising Resin Containing Fine Particles Method for Anti-Dazzling Layer Formation The anti-dazzling layer may be formed by mixing fine particles or aggregation-type fine particles (preferably first fine particles and second fine particles) and the resin with a proper solvent to give a composition for an anti-dazzling layer and coating the composition onto a light transparent base material. Suitable solvents used in this case include alcohols such as isopropyl alcohol, methanol, and ethanol; ketones such as methyl ethyl ketone (MEK), methyl isobutyl ketone (MIBK), and cyclohexanone; esters such as methyl acetate, ethyl acetate, and butyl acetate; halogenated hydrocarbons; aromatic hydrocarbons such as toluene and xylene; or their mixtures.

Methods usable for coating the composition for anti-dazzling layer onto the light transparent base material include coating methods such as roll coating, Mayer bar coating, and gravure coating. After coating of the composition for an anti-dazzling layer, the coating is dried and cured by ultraviolet irradiation. Specific examples of ultraviolet sources include light sources, for example, ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators. The resin is cured, and the fine particles in the resin are fixed to form a desired concavoconvex shape on the outermost surface of the anti-dazzling layer.

Fine Particles

The fine particles may be in a spherical, for example, truly spherical, elliptical or acicular form, preferably in a truly spherical form. In the present invention, the average particle diameter R (μm) of the fine particles is not less than 1.0 μm and not more than 20 μm. Preferably, the upper limit is 15.0 μm, and the lower limit is 3.5 μm.

In the present invention, not less than 80% (preferably not less than 90%) of the whole fine particles is accounted for by fine particles having an average particle diameter distribution of R±1.0 (preferably 0.3) μm. When the average particle diameter distribution of the fine particles falls within the above-defined range, the evenness of the concavoconvex shape of the anti-dazzling laminate can be rendered good and, at the same time, scintillation and the like can be effectively prevented. Further, the anti-dazzling layer may further comprise, in addition to the fine particles, second fine particles or third fine particles or a combination of a plurality of types of fine particles different from the fine particles in average particle diameter. For example, for small fine particles of which the average particle diameter R (μm) is approximately the lower limit value, i.e., about 3.5 μm, a concavoconvex layer can be efficiently formed using fine particles having a particle size distribution with the average particle diameter being 3.5 µm rather than monodisperse fine particles.

Aggregation-Type Fine Particles

In a preferred embodiment of the present invention, the use of aggregation-type fine particles among the fine particles is preferred. The aggregation-type fine particles may be identical fine particles, or alternatively may be a plurality of types of fine particles, the plurality of types being different from each other in average particle diameter. In a preferred embodiment of the present invention, the aggregation-type fine particles comprise first fine particles and second fine particles different from the first fine particles in average particle diameter. Further, in a more preferred embodiment of the present invention, the second fine particle as such or the aggregation part as such does not exhibit anti-dazzling properties in the anti-dazzling layer.

In the present invention, preferably, the fine particles satisfy the following formula (I):

$$0.25R \text{ (preferably 0.50)} \leq r \leq 1.0R \text{ (preferably 0.70)} \quad (I)$$

wherein R represents the average particle diameter of the fine particles, µm; and r represents the average particle diameter of the second fine particles, µm.

When the r value is not less than 0.25R, the dispersion of the coating composition is easy and, consequently, the particles are not aggregated. In the step of drying after coating, a uniform concavoconvex shape can be formed without undergoing an influence of wind during floating. Further, when r is not more than 0.85R, advantageously, the function of the fine particles can be clearly distinguished from the function of the first fine particles.

In another embodiment of the present invention, preferably, the total weight ratio per unit area among the resin, (first) fine particles, and second fine particles satisfies requirements represented by the following formulae (II) and (III):

$$0.08 \leq (M_1+M_2)/M \leq 0.36 \quad (II)$$

$$0 \leq M_2 \leq 4.0 M_1 \quad (III)$$

wherein $M_1$ represents the total weight of the (first) fine particles per unit area; $M_2$ represents the total weight of the second fine particles per unit area; and M represents the total weight of the resin per unit area.

In another preferred embodiment of the present invention, preferably, a requirement represented by the following formula (IV) is satisfied:

$$\Delta n = |n_1 - n_3| < 0.15 \text{ and/or } \Delta n = |n_2 - n_3| < 0.18 \quad (IV)$$

wherein $n_1$, $n_2$, and $n_3$ represent the refractive indexes of the (first) fine particles, the second fine particles, and the resin, respectively.

Fine particles (second fine particles) may be of inorganic type and organic type and are preferably formed of an organic material. The fine particles exhibit anti-dazzling properties and are preferably transparent. Specific examples of such fine particles include plastic beads, and transparent plastic beads are more preferred. Specific examples of plastic beads include styrene beads (refractive index 1.59), melamine beads (refractive index 1.57), acrylic beads (refractive index 1.49), acryl-styrene beads (refractive index 1.54), polycarbonate beads, and polyethylene beads. In a preferred embodiment of the present invention, the plastic bead has a hydrophobic group on its surface, and, for example, acrylic beads are preferred.

Resin

The anti-dazzling layer according to the present invention may be formed from a (curing-type) resin. In the present invention, the "resin" is a concept including resin components such as monomers and oligomers. The curing-type resin is preferably transparent, and specific examples thereof are classified into ionizing radiation curing resins which are curable upon exposure to ultraviolet light or electron beams, mixtures of ionizing radiation curing resins with solvent drying resins, or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl (meth)acrylate, ethylhexyl (meth)acrylate, styrene, methyl styrene, and N-vinylpyrrolidone, and polyfunctional monomers, for example, polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When ionizing radiation curing resins are used as an ultraviolet curing resin, preferably, a photopolymerization initiator is used. Specific examples of photopolymerization initiators include acetophenones, benzophenones, Michler's benzoyl benzoate, α-amyloxime ester, tetramethyl thiuram monosulfide, and thioxanthones. Preferably, photosensitizers are mixed in the system. Specific examples of photosensitizers include n-butylamine, triethylamine, and poly-n-butylphosphine.

The solvent drying-type resin used as a mixture with the ionizing radiation curing resin is mainly a thermoplastic resin. Coating defects of the coated face can be effectively prevented by adding the solvent drying-type resin. Commonly exemplified thermoplastic resins are usable. Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, and cellulose derivatives (for example, cellulose esters).

In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose. When the cellulosic resin is used, the adhesion between the light transparent base material and the antistatic layer (if any) and transparency can be improved. In addition to the above-described cellulose derivatives such as acetylcellulose, nitrocellulose, acetylbutylcellulose, ethylcellulose, and methylcellulose, vinyl resins such as vinyl acetate and its copolymers, vinyl chloride and its copolymers, and vinylidene chloride and its copolymers, acetal resins such as polyvinylformal and polyvinylbutyral, acrylic resins such as acrylic resin and its copolymers and methacrylic resin and its copolymers, polystyrene resins, polyamide resins, and polycarbonate resins.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Leveling Agent

In a preferred embodiment of the present invention, preferably, a fluoro- or silicone-type or other leveling agent is added to the composition for an anti-dazzling layer. The composition for an anti-dazzling layer to which the leveling agent has been added, can effectively prevent the inhibition of curing by oxygen to the surface of the coating film during coating or drying and, at the same time, impart scratch resistant effect. Preferably, the leveling agent is utilized in film-shaped light transparent base materials (for example, triacetylcellulose) which should be resistant to heat.

2) Method for Forming Anti-Dazzling Layer Using Composition for Anti-Dazzling Layer, Containing Resin and the Like but not Containing Fine Particles Method for Anti-Dazzling Layer Formation The anti-dazzling layer may be formed using a composition for an anti-dazzling layer, comprising at least one polymer and at least one curable resin precursor. The use of a composition for an anti-dazzling layer prepared by mixing at least one polymer and at least one curable resin precursor with a suitable solvent is advantageous in that at least an anti-dazzling layer can be formed by forming a phase separated structure by spinodal decomposition from a liquid phase and curing the curable resin precursor.

The spinodal decomposition from the liquid phase can be carried out by evaporating the solvent. The combination of materials which can form a phase separated structure may be, for example, a combination of a plurality of polymers, a combination of a polymer and a curable resin precursor, or a combination of a plurality of curable resin precursors. In this method, an anti-dazzling layer may also be formed by subjecting a composition comprising a thermoplastic resin, a photocuring compound (for example, a photopolymerizable monomer or oligomer), a photopolymerization initiator, and a solvent capable of dissolving the thermoplastic resin and photocurable compound (a common solvent) to spinodal decomposition to form a phase separated structure and exposing the product to light. Alternatively, the anti-dazzling layer may be formed by subjecting a composition comprising a thermoplastic resin, a resin incompatible with the thermoplastic resin and containing a photocurable group, a photocuring compound, a photopolymerization initiator, and a solvent capable of dissolving the resin and the photocuring compound to spinodal decomposition to form a phase separated structure, and applying light to the assembly. In these methods, at least one anti-dazzling layer may be formed on a light transparent base material.

Specific Formation Method

The anti-dazzling layer may be formed by a process comprising the steps of: mixing at least one polymer and at least one curable resin precursor using a proper solvent to prepare a composition for an anti-dazzling layer, applying the composition for an anti-dazzling layer onto a light transparent base material and then subjecting the coating to spinodal decomposition involving the evaporation of the solvent to form a phase separated structure; and curing the curable resin precursor to form at least an anti-dazzling layer. The phase separation step generally comprises the step of coating or casting a mixed liquid containing a polymer and a curable resin precursor and a solvent (particularly a liquid composition such as a homogeneous solution) onto the surface of a light transparent base material and the step of evaporating the solvent from the coating layer or casting layer to form a phase separated structure having a regular or periodical average phase-to-phase distance. The anti-dazzling layer can be formed by curing the curable resin precursor.

In a preferred embodiment of the present invention, the mixed liquid may be a composition for an anti-dazzling layer, comprising a thermoplastic resin, a photocuring compound, a photopolymerization initiator, and a solvent capable of dissolving the thermoplastic resin and photocuring compound. The anti-dazzling layer is formed by applying light to photocurable components in the phase separated structure formed by the spinodal decomposition to cure the photocurable components. In another preferred embodiment of the present invention, the mixed liquid may be a composition for an anti-dazzling layer, comprising a plurality of mutually incompatible polymers, a photocuring compound, a photopolymerization initiator, and a solvent. In this case, the anti-dazzling layer is formed by applying light to photocurable components in the phase separated structure formed by the spinodal decomposition to cure the photocurable components.

The spinodal decomposition involving the evaporation of the solvent can impart regularity or periodicity to the average distance between domains in the phase separated structure. The phase separated structure formed by the spinodal decomposition can be immediately fixed by curing the curable resin precursor. The curable resin precursor can be cured, for example, by heating or light irradiation or a combination of these methods according to the type of the curable resin precursor. The heating temperature can be selected, for example, from a suitable temperature range, for example, from a range of approximately 50 to 150° C., so far as the phase separated structure is present, and may be selected from the same temperature range as in the phase separation step.

The anti-dazzling layer constituting a part of the optical laminate is formed by forming a phase separated structure in the anti-dazzling layer by spinodal decomposition (wet spinodal decomposition) from a liquid phase. Specifically, a composition for an anti-dazzling layer according to the present invention, comprising a polymer, a curable resin precursor, and a solvent is provided. The solvent is evaporated or removed from the composition for an anti-dazzling layer in its liquid phase (or a homogeneous solution or coating layer thereof) by drying or the like. In the course of drying or the like, an increase in concentration causes phase separation by spinodal decomposition to form a phase separated structure having a relatively regular phase-to-phase distance. More specifically, the wet spinodal decomposition is generally carried out by coating a composition for an anti-dazzling layer (preferably a homogeneous solution) comprising at least one polymer, at least one curable resin precursor, and a solvent onto a support and evaporating the solvent from the coating layer.

In the present invention, in the spinodal decomposition, as the phase separation proceeds, a co-continuous phase structure is formed. As the phase separation further proceeds, the continuous phase is rendered discontinuous by the surface tension of the phase per se to form a liquid droplet phase structure (a sea-island structure of spherical, truly spherical, disk-like, elliptical or other independent phases). Accordingly, depending upon the degree of the phase separation, a structure intermediate between a co-continuous structure and a liquid droplet phase structure (a phase structure in the course of transfer from the co-continuous phase to the liquid droplet phase) can also be formed. The phase separated structure of the anti-dazzling layer according to the present invention may be a sea-island structure (a liquid droplet phase structure or a phase structure in which one of the phases is independent or isolated), a co-continuous phase structure (or a network structure), or an intermediate structure in which a co-continuous phase structure and a liquid droplet phase structure exist together. By virtue of the phase separated structure, after the removal of the solvent by drying, fine concavoconvexes can be formed on the surface of the anti-dazzling layer.

In the phase separated structure, concavoconvexes are formed on the surface of the anti-dazzling layer, and, from the viewpoint of enhancing the surface hardness, a liquid droplet phase structure having at least island domains is advantageous. When the phase separated structure composed of the polymer and the precursor (or curable resin) is a sea-island structure, the polymer component may constitutes a sea phase. From the viewpoint of the surface hardness, however, the polymer component preferably constitutes island domains. The formation of island domains leads to the formation of a concavoconvex shape having desired optical characteristics on the surface of the anti-dazzling layer after drying.

The average distance between domains in the phase separated structure is generally substantially regular or periodical. For example, the average phase-to-phase distance of domains may be, for example, approximately 1 to 70 μm (for example, 1 to 40 μm), preferably 2 to 50 μm (for example, 3 to 30 μm), more preferably 5 to 20 μm (for example, 10 to 20 μm).

Polymer

The polymer may be a plurality of polymers which can be phase separated by a spinodal decomposition, for example, a cellulose derivative and a styrenic resin, an (meth)acrylic resin, an alicyclic olefinic resin, a polycarbonate resin, a polyester resin or the like, or a combination thereof. The curable resin precursor may be compatible with at least one polymer in the plurality of polymers. At least one of the plurality of polymers may have a functional group involved in a curing reaction of the curable resin precursor, for example, a polymerizable group such as an (meth)acryloyl group. In general, a thermoplastic resin is used as the polymer component.

Specific examples of thermoplastic resins include styrenic resins, (meth)acrylic resins, organic acid vinyl ester resins, vinyl ether resins, halogen-containing resins, olefinic resins (including alicyclic olefinic resins), polycarbonate resins, polyester resins, polyamide resins, thermoplastic polyurethane resins, polysulfone resins (for example, polyethersulfone and polysulfone), polyphenylene ether resins (for example, polymers of 2,6-xylenol), cellulose derivatives (for example, cellulose esters, cellulose carbamates, and cellulose ethers), silicone resins (for example, polydimethylsiloxane and polymethylphenylsiloxane), and rubbers or elastomers (for example, diene rubbers such as polybutadiene and polyisoprene, styrene-butadiene copolymers, acrylonitrile-butadiene copolymers, acrylic rubbers, urethane rubbers, and silicone rubbers). They may be used either solely or in a combination of two or more.

Specific examples of styrenic resins include homopolymers or copolymers of styrenic monomers (for example, polystyrenes, styrene-α-methylstyrene copolymers, and styrene-vinyltoluene copolymers) and copolymers of styrenic monomers with other polymerizable monomers (for example, (meth)acrylic monomers, maleic anhydride, maleimide monomers, or dienes). Styrenic copolymers include, for example, styrene-acrylonitrile copolymers (AS resins), copolymers of styrene with (meth)acrylic monomers (for example, styrene-methyl methacrylate copolymers, styrene-methyl methacrylate-(meth)acrylic ester copolymers, or styrene-methyl methacrylate-(meth)acrylic acid copolymers), and styrene-maleic anhydride copolymers. Preferred styrenic resins include copolymers of polystyrene or styrene with (meth)acrylic monomers (for example, copolymers composed mainly of styrene and methyl methacrylate, for example, styrene-methyl methacrylate copolymers), AS resins, and styrene-butadiene copolymers.

For example, homopolymers or copolymers of (meth)acrylic monomers and copolymers of (meth)acrylic monomers with copolymerizable monomers may be mentioned as the (meth)acrylic resin. Specific examples of (meth)acrylic monomers include (meth)acrylic acid; $C_{1-10}$ alkyl (meth)acrylates such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate, and 2-ethylhexyl (meth)acrylate; aryl (meth)acrylates such as phenyl (meth)acrylate; hydroxyalkyl (meth)acrylate such as hydroxyethyl (meth)acrylate and hydroxypropyl (meth)acrylate; glycidyl (meth)acrylate; N,N-dialkylaminoalkyl (meth)acrylate; (meth)acrylonitrile; and (meth)acrylates containing an alicyclic hydrocarbon group, such as tricyclodecane. Specific examples of copolymerizable monomers include the above styrenic monomers, vinyl ester monomers, maleic anhydride, maleic acid, and fumaric acid. These monomers may be used either solely or in a combination of two or more.

Specific examples of (meth)acrylic resins include poly(meth)acrylic esters such as polymethyl methacrylate, methyl methacrylate-(meth)acrylic acid copolymers, methyl methacrylate-(meth)acrylic ester copolymers, methyl methacrylate-acrylic ester-(meth)acrylic acid copolymers, and (meth)acrylic ester-styrene copolymers (for example, MS resins). Specific examples of preferred (meth)acrylic resins include poly-$C_{1-6}$ alkyl (meth)acrylates such as polymethyl (meth)acrylate. In particular, methyl methacrylate resins composed mainly of methyl methacrylate (approximately 50 to 100% by weight, preferably 70 to 100% by weight) may be mentioned.

Specific examples of organic acid vinyl ester resins include homopolymers or copolymers of vinyl ester monomers (for example, polyvinyl acetate and polyvinyl propionate), copolymers of vinyl ester monomers with copolymerizable monomers (for example, ethylene-vinyl acetate copolymers, vinyl acetate-vinyl chloride copolymers, and vinyl acetate-(meth)acrylic ester copolymers), or their derivatives. Specific examples of vinyl ester resin derivatives include polyvinyl alcohol, ethylene-vinyl alcohol copolymers, and polyvinylacetal resins.

Specific examples of vinyl ether resins include homopolymers or copolymers of vinyl $C_{1-10}$ alkyl ethers such as vinyl methyl ether, vinyl ethyl ether, vinyl propyl ether, or vinyl t-butyl ether, copolymers of vinyl $C_{1-10}$ alkyl ethers with copolymerizable monomers (for example, vinyl alkyl ether-maleic anhydride copolymers). Specific examples of halogen-containing resins include polyvinyl chloride, polyfluorinated vinylidenes, vinyl chloride-vinyl acetate copolymers, vinyl chloride-(meth)acrylic ester copolymers, and vinylidene chloride-(meth)acrylic ester copolymers.

Specific examples of olefinic resins include homopolymers of olefins such as polyethylene and polypropylene, and copolymers such as ethylene-vinyl acetate copolymers, ethylene-vinyl alcohol copolymers, ethylene-(meth)acrylic acid copolymers, and ethylene-(meth)acrylic ester copolymers.

Specific examples of alicyclic olefinic resins include homopolymers or copolymers of cyclic olefins (for example, norbornene, dicyclopentadiene) (for example, polymers containing an alicyclic hydrocarbon group such as tricyclodecane which is sterically rigid), and copolymers of the above cyclic olefins with copolymerizable monomers (for example, ethylene-norbornene copolymers and propylene-norbornene copolymers). Specific examples of alicyclic olefinic resins include those which are available, for example, under the tradenames "ARTON" and "ZEONEX."

Specific examples of polycarbonate resins include aromatic polycarbonates based on bisphenols (for example, bisphenol A), and aliphatic polycarbonates such as diethylene glycol bisallyl carbonates.

Specific examples of polyester resins include aromatic polyesters using aromatic dicarboxylic acids such as terephthalic acid, for example, homopolyesters, for example, poly-$C_{2-4}$-alkylene terephthalates and poly-$C_{2-4}$-alkylene naphthalates including polyethylene terephthalate and polybutylene terephthalate, and copolyesters comprising as a main component (for example, not less than 50% by weight) $C_{2-4}$ alkylene arylate units ($C_{2-4}$ alkylene terephthalate and/or $C_{2-4}$ alkylene naphthalate units). Specific examples of copolyesters include copolyesters in which, in the constituent units of poly-$C_{2-4}$-alkylene arylate, a part of $C_{2-4}$ alkylene glycol has been replaced, for example, with a polyoxy-$C_{2-4}$-alkylene glycol, a $C_{6-10}$ alkylene glycol, an alicyclic diol (for example, cyclohexanedimethanol or hydrogenated bisphenol A), an aromatic ring-containing diol (for example, 9,9-bis(4-(2-hydroxyethoxy)phenyl)fluorene having a fluorenone side chain, bisphenol A, or a bisphenol A-alkylene oxide adduct), and copolyesters in which a part of aromatic dicarboxylic acid has been replaced, for example, with an aliphatic $C_{6-12}$ dicarboxylic acid, for example, an asymmetric aromatic dicarboxylic acid such as phthalic acid or isophthalic acid, or adipic acid. Specific examples of polyester resins include polyarylate resins, aliphatic polyesters using aliphatic dicarboxylic acids such as adipic acid, and homopolymers and copolymers of lactones such as ε-caprolactone. Preferred polyester resins are generally noncrystalline polyester resins such as noncrystalline copolyesters (for example, $C_{2-4}$ alkylene arylate copolyesters).

Specific examples of polyamide resins include aliphatic polyamides such as nylon 46, nylon 6, nylon 66, nylon 610, nylon 612, nylon 11, and nylon 12, and polyamides produced from dicarboxylic acids (for example, terephthalic acid, isophthalic acid, or adipic acid) and diamines (for example, hexamethylenediamine or metaxylylenediamine). Specific examples of polyamide resins include homopolymers or copolymers of lactams such as ε-caprolactam. The polyamide resins may be either homopolyamides or copolyamides.

Specific examples of cellulose esters among the cellulose derivatives include, for example, aliphatic organic acid esters, for example, cellulose acetates such as cellulose diacetate and cellulose triacetate; and $C_{1-6}$ organic acid esters such as cellulose propionate, cellulose butyrate, cellulose acetate propionate, and cellulose acetate butyrate. Further examples thereof include aromatic organic acid esters ($C_{7-12}$ aromatic carboxylic esters such as cellulose phthalate and cellulose benzoate) and inorganic acid esters, for example, cellulose phosphate and cellulose sulphate. Mixed acid esters such as acetic acid-nitric acid cellulose ester may also be used. Specific examples of cellulose derivatives include cellulose carbamates (for example, cellulose phenylcarbamate) and further include cellulose ethers, for example, cyanoethylcellulose; hydroxy-$C_{2-4}$-alkylcelluloses such as hydroxyethylcellulose and hydroxypropylcellulose; $C_{1-6}$ alkylcelluloses such as methylcellulose and ethylcellulose; and carboxymethylcellulose or its salt, benzylcellulose, and acetylalkylcellulose.

Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, rubbers or elastomers. Resins, which are usually noncrystalline and soluble in organic solvents (particularly common solvents which can dissolve a plurality of polymers or curable compounds). Particularly preferred are, for example, resins having a high level of moldability or film formability, transparency and weathering resistance, for example, styrenic resins, (meth)acrylic resins, alicyclic olefinic resins, polyester resins, and cellulose derivatives (for example, cellulose esters).

Polymers containing a functional group involved in a curing reaction (or a functional group reactive with a curable compound) are also usable as the polymer component. The polymers may contain a functional group in the main chain or side chain. The functional group may be introduced into the main chain, for example, by copolymerization or co-condensation. In general, however, the functional group is introduced into the side chain. Specific examples of such functional groups include condensable groups and reactive groups (for example, hydroxyl group, acid anhydride group, carboxyl group, amino group or imino group, epoxy group, glycidyl group, and isocyanate group), polymerizable groups (for example, $C_{2-6}$ alkenyl groups such as vinyl, propenyl, isopropenyl, butenyl and allyl groups, $C_{2-6}$ alkynyl groups such as ethynyl, propynyl, and butynyl groups, and $C_{2-6}$ alkenylidene groups such as vinylidene), or groups containing these polymerizable groups (for example, (meth)acryloyl group). Among these functional groups, polymerizable groups are preferred.

The polymerizable group may be introduced into the side chain, for example, by reacting a thermoplastic resin containing a functional group such as a reactive group or a condensable group with a polymerizable compound containing a group reactive with the functional group.

Examples of such functional group-containing thermoplastic resins include thermoplastic resins containing a carboxyl group or its acid anhydride group (for example, (meth)acrylic resins, polyester resins, and polyamide resins), hydroxyl group-containing thermoplastic resins (for example, (meth)acrylic resins, polyurethane resins, cellulose derivatives, and polyamide resins), amino group-containing thermoplastic resins (for example, polyamide resins), epoxy group-containing thermoplastic resins (for example, epoxy group-containing (meth)acrylic resins and polyester resins). Resins comprising the above functional group introduced into thermoplastic resins such as styrenic resins, olefinic resins, or alicyclic olefinic resins by copolymerization or graft polymerization are also possible.

Regarding the polymerizable compound, thermoplastic resins containing a carboxyl or its acid anhydride group include polymerizable compounds containing epoxy, hydroxyl, amino, or isocyanate groups. Hydroxyl group-containing thermoplastic resins include polymerizable compounds containing carboxyl groups or acid anhydride groups thereof or isocyanate groups. Amino group-containing thermoplastic resins include polymerizable compounds containing carboxyl groups or acid anhydride groups thereof, epoxy groups, and isocyanate groups. Epoxy group-containing thermoplastic resins include polymerizable compounds containing carboxyl groups or acid anhydride groups thereof or amino groups.

Among the above polymerizable compounds, epoxy group-containing polymerizable compounds include, for example, epoxycyclo-$C_{5-8}$-alkenyl (meth)acrylates such as epoxycyclohexenyl (meth)acrylate, glycidyl (meth)acrylate, and allyl glycidyl ether. Hydroxyl group-containing compounds include, for example, hydroxy-$C_{1-4}$-alkyl (meth)acrylates such as hydroxypropyl (meth)acrylate, and $C_{2-6}$ alkylene glycol (meth)acrylates such as ethylene glycol mono (meth)acrylate. Amino group-containing polymerizable compounds include, for example, amino-$C_{1-4}$-alkyl (meth)acrylates such as aminoethyl (meth)acrylate, $C_{3-6}$ alkenylamines such as allylamine, and aminostyrenes such as 4-aminostyrene and diaminostyrene. Isocyanate group-containing polymerizable compounds include, for example, (poly)urethane(meth)acrylate and vinyl isocyanate. Polymerizable compounds containing carboxyl groups or acid anhydride groups thereof include, for example, unsaturated carboxylic acids or anhydrides thereof such as (meth)acrylic acid and maleic anhydride.

A combination of a thermoplastic resin containing a carboxyl group or its acid anhydride group with an epoxy group-containing compound, particularly a combination of an (meth)acrylic resin (for example, an (meth)acrylic acid-(meth)acrylic ester copolymer) with an epoxy group-containing (meth)acrylate (for example, epoxycycloalkenyl (meth)acrylate or glycidyl (meth)acrylate) may be mentioned as a representative example of the polymerizable compound. Specific examples thereof include polymers comprising a polymerizable unsaturated group introduced into a part of carboxyl groups in an (meth)acrylic resin, for example, an (meth)acrylic polymer produced by reacting a part of carboxyl groups in an (meth)acrylic acid-(meth)acrylic ester copolymer with an epoxy group in 3,4-epoxycyclohexenylmethyl acrylate to introduce a photopolymerizable unsaturated group into the side chain (CYCLOMER P, manufactured by Daicel Chemical Industries, Ltd.).

The amount of the functional group (particularly polymerizable group) involved in a curing reaction with the thermoplastic resin introduced is approximately 0.001 to 10 moles, preferably 0.01 to 5 moles, more preferably 0.02 to 3 moles based on 1 kg of the thermoplastic resin.

These polymers may be used in a suitable combination. Specifically, the polymer may comprise a plurality of polymers. The plurality of polymers may be phase separated by liquid phase spinodal decomposition. The plurality of polymers may be incompatible with each other. When the plurality of polymers are used in combination, the combination of a first resin with a second resin is not particularly limited. For example, a plurality of suitable polymers incompatible with each other at a temperature around a processing temperature, for example, two suitable polymers incompatible with each other may be used. For example, when the first resin is a styrenic resin (for example, polystyrene or a styrene-acrylonitrile copolymer), examples of second resins usable herein include cellulose derivatives (for example, cellulose esters such as cellulose acetate propionate), (meth)acrylic resins (for example, polymethyl methacrylate), alicyclic olefinic resins (for example, polymers using norbornene as a monomer), polycarbonate resins, and polyester resins (for example, the above poly-$C_{2-4}$-alkylene arylate copolyesters). On the other hand, for example, when the first polymer is a cellulose derivative (for example, a cellulose ester such as cellulose acetate propionate), examples of second polymers usable herein include styrenic resins (for example, polystyrene or styrene-acrylonitrile copolymer), (meth)acrylic resins, alicyclic olefinic resins (for example, polymers using norbornene as a monomer), polycarbonate resins, and polyester resins (for example, the above poly-$C_{2-4}$-alkylene arylate copolyester). In the combination of the plurality of resins, at least cellulose esters (for example, cellulose $C_{2-4}$ alkyl carboxylic esters such as cellulose diacetate, cellulose triacetate, cellulose acetate propionate, or cellulose acetate butyrate) may be used.

The phase separated structure produced by the spinodal decomposition is finally cured by the application of an actinic radiation (for example, ultraviolet light or electron beam), heat or the like to form a cured resin. By virtue of this, the scratch resistance can be imparted to the anti-dazzling layer, and the durability can be improved.

From the viewpoint of scratch resistance after curing, preferably, at least one polymer in the plurality of polymers, for example, one of mutually incompatible polymers (when the first and second resins are used in combination, particularly both the polymers) is a polymer having on its side chain a functional group reactive with a curable resin precursor.

The weight ratio between the first polymer and the second polymer may be selected, for example, from a range of first polymer/second polymer=approximately 1/99 to 99/1, preferably 5/95 to 95/5, more preferably 10/90 to 90/10 and is generally approximately 20/80 to 80/20, particularly 30/70 to 70/30.

Regarding the polymer for phase separated structure formation, in addition to the above two incompatible polymers, the above thermoplastic resins or other polymers may be incorporated.

The glass transition temperature of the polymer may be selected, for example, from a range of approximately −100° C. to 250° C., preferably −50° C. to 230° C., more preferably 0 to 200° C. (for example, approximately 50 to 180° C.). A glass transition temperature of 50° C. or above (for example, approximately 70 to 200° C.), preferably 100° C. or above (for example, approximately 100 to 170° C.), is advantageous from the viewpoint of the surface hardness. The weight average molecular weight of the polymer may be selected, for example, from a range of approximately not more than 1,000,000, preferably 1,000 to 500,000.

Curable Resin Precursor

The curable resin precursor is a compound containing a functional group which can be reacted upon exposure, for example, to heat or an actinic radiation (for example, ultraviolet light or electron beams), and various curable compounds, which can be cured or crosslinked upon exposure to heat, an actinic radiation or the like to form a resin (particularly a cured or crosslinked resin), can be used. Examples of such resin precursors include heat curing compounds or resins [low-molecular weight compounds containing epoxy groups, polymerizable groups, isocyanate groups, alkoxysilyl groups, or silanol groups (for example, epoxy resins, unsaturated polyester resins, urethane resins, or silicone resins)], and photocuring compounds curable upon exposure to an actinic radiation (for example, ultraviolet light) (for example, ultraviolet light curing compounds such as photocuring monomers and oligomers). The photocuring compound may be, for example, an EB (electron beam) curing compound. Photocuring compounds such as photocuring monomers, oligomers, photocuring resins which may have a low-molecular weight, are sometimes referred to simply as "photocuring resin."

Photocuring compounds include, for example, monomers and oligomers (or resins, particularly low-molecular weight resins). Monomers include, for example, monofunctional monomers [(meth)acrylic monomers such as (meth)acrylic esters, vinyl monomers such as vinylpyrrolidone, crosslinked ring-type hydrocarbon group-containing (meth)acrylates such as isobornyl (meth)acrylate or adamantyl (meth)acrylate)], polyfunctional monomers containing at least two polymerizable unsaturated bonds [for example, alkylene glycol di(meth)acrylates such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylates such as diethylene glycol di(meth)acrylate, dipropylene glycol di(meth)acrylate, and polyoxytetramethylene glycol di(meth)acrylate; crosslinked ring-type hydrocarbon group-containing di(meth)acrylates such as tricyclodecane dimethanol di(meth)acrylate and adamantane di(meth)acrylate; and polyfunctional monomers containing about three to six polymerizable unsaturated bonds such as trimethylolpropane tri(meth)acrylate, trimethylolethane tri(meth)acrylate, pentaerythritol tri(meth)acrylate, pentaerythritol tetra(meth)acrylate, and dipentaerythritol penta(meth)acrylate].

Oligomers or resins include (meth)acrylate or epoxy(meth)acrylate of bisphenol A-alkylene oxide adducts (for example, bisphenol A-type epoxy(meth)acrylate and novolak-type epoxy(meth)acrylate), polyester(meth)acrylates (for example, aliphatic polyester-type (meth)acrylate and aromatic polyester-type (meth)acrylate), (poly)urethane(meth)acrylate (for example, polyester-type urethane(meth)acrylate, polyether-type urethane(meth)acrylate), and silicone (meth)acrylate. These photocuring compounds are usable either solely or in a combination of two or more.

Preferred curable resin precursors include photocuring compounds curable in a short time, for example, ultraviolet light curing compounds (for example, monomers, oligomers and resins which may have a low-molecular weight), and EB curing compounds. Resin precursors which are particularly advantageous from the practical viewpoint are ultraviolet curing resins. From the viewpoint of improving resistance such as scratch resistance, preferably, the photocuring resin is a compound having in its molecule two or more (preferably approximately 2 to 6, more preferably 2 to 4) polymerizable unsaturated bonds. The molecular weight of the curable resin precursor is approximately not more than 5000, preferably not more than 2000, more preferably not more than 1000, from the viewpoint of compatibility with the polymer.

The curable resin precursor may contain a curing agent depending upon the type of the curable resin precursor. For example, in the case of heat curing resins, curing agents such as amines or polycarboxylic acids may be contained, and, in the case of photocuring resins, photopolymerization initiators may be contained. Examples of photopolymerization initiators include commonly used components, for example, acetophenones or propiophenones, benzyls, benzoins, benzophenones, thioxanthones, and acylphosphine oxides. The content of the curing agent such as a photocuring agent is approximately 0.1 to 20 parts by weight, preferably 0.5 to 10 parts by weight, more preferably 1 to 8 parts by weight (particularly 1 to 5 parts by weight), based on 100 parts by weight of the curable resin precursor and may be approximately 3 to 8 parts by weight.

The curable resin precursor may contain a curing accelerator. For example, the photocuring resin may contain photocuring accelerators, for example, tertiary amines (for example, dialkylaminobenzoic esters) and phosphine photopolymerization accelerators.

Specific Combination of Polymer with Curable Resin Precursor

At least two components in at least one polymer and at least one curable resin precursor may be used in a combination of materials which are mutually phase separated at a temperature around the processing temperature. Examples of such combinations include (a) a combination of a plurality of polymers which are mutually incompatible and phase separated, (b) a combination of a polymer and a curable resin precursor which are mutually incompatible and phase separated, and (c) a combination of a plurality of curable resin precursors which are mutually incompatible and phase separated. Among these combinations, (a) a combination of a plurality of polymers and (b) a combination of a polymer with a curable resin precursor are generally preferred, and particularly (a) a combination of a plurality of polymers is preferred. When the compatibility of both the materials to be phase separated is low, both the materials are effectively phase separated in the course of drying for evaporating the solvent and the function as an anti-dazzling layer can be improved.

The thermoplastic resin and the curable resin precursor (or curing-type resin) are generally incompatible with each other. When the polymer and the curable resin precursor are incompatible with each other and phase separated, a plurality of polymers may be used as the polymer. When a plurality of polymers are used, meeting the requirement that at least one polymer is incompatible with the resin precursor (or curing-type resin) suffices for contemplated results, and the other polymer(s) may be compatible with the resin precursor.

A combination of two mutually incompatible thermoplastic resins with a curing compound (particularly a monomer or oligomer containing a plurality of curable functional groups) may be adopted. From the viewpoint of scratch resistance after curing, one polymer (particularly both polymers) in the incompatible thermoplastic resins may be a thermoplastic resin containing a functional group involved in the curing reaction (a functional group involved in curing of the curable resin precursor).

When a combination of a plurality of mutually incompatible polymers is adopted for phase separation, the curable resin precursor to be used in combination with the plurality of mutually incompatible polymers is compatible with at least one polymer in the plurality of incompatible polymers at a temperature around the processing temperature. Specifically, for example, when the plurality of mutually incompatible polymers are constituted by the first resin and the second resin, the curable resin precursor may be one which is compatible with at least one of the first resin and the second resin, preferably is compatible with both the polymer components. When the curable resin precursor is compatible with both the polymer components, phase separation occurs into at least two phases, i.e., a mixture composed mainly of a first resin and a curable resin precursor and a mixture composed mainly of a second resin and a curable resin precursor.

When the compatibility of a plurality of selected polymers is low, the polymers are effectively phase separated from each other in the course of drying for evaporating the solvent and the function as an anti-dazzling layer is improved. The phase separability of the plurality of polymers can be simply determined by a method in which a homogeneous solution is prepared using a good solvent for both the components and the solvent is gradually evaporated to visually inspect whether or not the residual solid matter is opaque in the course of drying.

In general, the polymer and the cured or crosslinked resin produced by curing of the resin precursor are different from each other in refractive index. Further, the plurality of polymers (first and second resins) are also different from each other in refractive index. The difference in refractive index between the polymer and the cured or crosslinked resin, and the difference in refractive index between the plurality of polymers (first and second resins) may be, for example, approximately 0.001 to 0.2, preferably 0.05 to 0.15.

The weight ratio between the polymer and the curable resin precursor is not particularly limited and may be selected, for example, from a range of polymer/curable resin precursor=approximately 5/95 to 95/5, and, from the viewpoint of surface hardness, is preferably polymer/curable resin precursor=approximately 5/95 to 60/40, more preferably 10/90 to 50/50, particularly preferably 10/90 to 40/60.

Solvent

The solvent may be selected and used according to the type and solubility of the polymer and curable resin precursor. A solvent capable of homogeneously dissolving at least the solid matter (a plurality of polymers and curable resin precursor, a reaction initiator, and other additives) suffices for contemplated results and may be used in wet spinodal decomposition. Examples of such solvents include ketones (for example, acetone, methyl ethyl ketone, methyl isobutyl ketone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene and xylene), halogenated hydrocarbons (for example, dichloromethane and dichloroethane), esters (for example, methyl acetate, ethyl acetate and butyl acetate), water, alcohols (for example, ethanol, isopropanol, butanol, and cyclohexanol), cellosolves (for example, methylcellosolve and ethylcellosolve), cellosolve acetates, sulfoxides (for example, dimethylsulfoxide), and amides (for example, dimethylformamide and dimethylacetamide). A mixture solvents composed of two or more of these solvents may be used.

The concentration of the solute (polymer and curable resin precursor, reaction initiator, and other additives) in the composition for an anti-dazzling layer may be selected from such a range that causes phase separation and such a range that castability, coatability and the like are not deteriorated. The solute concentration is, for example, approximately 1 to 80% by weight, preferably 5 to 60% by weight, more preferably 15 to 40% by weight (particularly 20 to 40% by weight).

3) Method for Forming Anti-Dazzling Layer Using Treatment for Imparting a Concavoconvex Shape The anti-dazzling layer according to the present invention may be formed by subjecting the surface of an anti-dazzling layer, formed using a fine particle-free composition for an anti-dazzling layer comprising a polymer, a resin and the like or an anti-dazzling layer, which is not yet in a completed state, that is, during a stage of formation, to treatment for imparting a concavoconvex shape. This method may be the same as described above in connection with the production process and production apparatus according to the present invention.

2. Surface Modifying Layer

In the present invention, a surface modifying layer may be formed to regulate the concavoconvex surface of the anti-dazzling layer. In this case, the surface modifying layer is integrated with the anti-dazzling layer to exhibit an anti-dazzling function. Accordingly, in the formation of the surface modifying layer, optical property values such as Sm, θa, and Rz as surface concavoconvex shape values fall within the scope of the present invention. Further, when the surface modifying layer is applied onto the anti-dazzling layer, the surface concavoconvex shape of the surface modifying layer is of course identical to the optical property values of the surface concavoconvex shape of the anti-dazzling layer in the present invention. The above matter can be understood from the following detailed description on the surface modifying layer and working examples.

In the surface modifying layer, fine concavoconvexes present along the concavoconvex shape on the scale of one-tenth or less of the concavo-convex scale (profile peak height of concavoconvexes and spacing between profile peaks) in the surface roughness constituting the concavoconvex shape of the anti-dazzling layer can be sealed for smoothing to form smooth concavoconvexes, or the spacing between profile peaks of the concavoconvexes and peak profile height, and the frequency (number) of the profile peaks can be regulated. The surface modifying layer can be formed, for example, for imparting antistatic properties, refractive index regulation, hardness enhancement, contamination preventive properties and the like. The thickness (on a cured state bases) of the surface modifying layer is not less than 0.5 μm and not more than 27 μm (preferably not more than 12 μm). Preferably, the lower limit of the thickness of the surface modifying layer is 3 μm, and the upper limit of the thickness of the surface modifying layer is 8 μm.

Surface Modifying Agent

One material or a mixture of two or more materials selected from the group consisting of antistatic agents, refractive index regulating agents, contamination preventive agents, water repellents, oil repellents, fingerprint adhesion preventive agents, curability enhancing agents, and hardness regulating agents (cushioning property imparting agents) may be mentioned as the surface modifying agent.

Antistatic Agent (Electroconductive Agent)

When an antistatic agent is contained in the surface modifying layer, dust adhesion to the surface of the optical laminate can be effectively prevented. Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metallic chelate moiety and are polymerizable upon exposure to ionizing radiations, or organometallic compounds such as functional group-containing coupling agents may also be used as the antistatic agent.

Further, electroconductive ultrafine particles may be mentioned as the antistatic agent. Specific examples of electroconductive ultrafine particles include ultrafine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

In a preferred embodiment of the present invention, the addition amount ratio of the resin to the antistatic agent contained in the surface modifying layer is not less than 5 and not more than 25. Preferably, the upper limit of the addition amount ratio is 20, and the lower limit of the addition amount ratio is 5.

Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

Refractive Index Regulating Agent

The refractive index regulating agent may be added to the surface modifying layer to regulate the optical properties of the optical laminate. Examples of such refractive index regulating agents include low-refractive index agents, medium-refractive index agents, and high-refractive index agents.

1) Low-Refractive Index Agent

The low-refractive index agent has a lower refractive index than the anti-dazzling layer. In a preferred embodiment of the present invention, the anti-dazzling layer has a refractive index of not less than 1.5, and the low-refractive index agent has a refractive index of less than 1.5, preferably not more than 1.45.

Specific examples of low-refractive index agents include silicone-containing vinylidene fluoride copolymers, and an example thereof is a composition comprising 100 parts by weight of a fluorine-containing copolymer and 80 to 150 parts by weight of an ethylenically unsaturated group-containing polymerizable compound. The fluorine-containing copolymer has a fluorine content of 60 to 70% by weight and is produced by copolymerizing a monomer composition comprising 30 to 90% by weight of vinylidene fluoride and 5 to 50% by weight of hexafluoropropylene.

A copolymer produced by copolymerizing a monomer composition containing vinylidene fluoride and hexafluoropropylene may be mentioned as the fluorine-containing copolymer. Regarding the proportion of each component in the monomer composition, the content of vinylidene fluoride is 30 to 90% by weight, preferably 40 to 80% by weight, particularly preferably 40 to 70% by weight, or the content of hexafluoropropylene is 5 to 50% by weight, preferably 10 to 50% by weight, particularly preferably 15 to 45% by weight. The monomer composition may further comprise 0 to 40% by weight, preferably 0 to 35% by weight, particularly preferably 10 to 30% by weight, of tetrafluoroethylene.

The monomer composition for producing the fluorine-containing copolymer may if necessary contain other comonomer component(s), for example, in an amount of not more than 20% by weight, preferably not more than 10% by weight. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition is preferably 60 to 70% by weight, more preferably 62 to 70% by weight, particularly preferably 64 to 68% by weight. When the fluorine content is in the above-defined range, the fluorine-containing copolymer has good solubility in solvents which will be described later. The incorporation of the fluorine-containing copolymer as a component can realize the formation of an optical laminate having excellent adhesion, a high level of transparency, a low refractive index, and excellent mechanical strength.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability.

The refractive index of the fluorine-containing copolymer per se is preferably not more than 1.45, more preferably not more than 1.42, still more preferably not more than 1.40. When the refractive index is in the above defined range, the formed optical laminate has good antireflection effect.

The addition amount of the resin is 30 to 150 parts by weight, preferably 35 to 100 parts by weight, more preferably 40 to 70 parts by weight, based on 100 parts by weight of the fluorine-containing copolymer. The content of fluorine based on the total amount of the polymer forming component comprising the fluorine-containing copolymer and the resin is 30 to 55% by weight, preferably 35 to 50% by weight.

When the addition amount or the fluorine content is in the above-defined range, the surface modifying layer has good adhesion to the base material and has a low refractive index, whereby good antireflection effect can be attained.

In a preferred embodiment of the present invention, the utilization of "void-containing fine particles" as a low-refractive index agent is preferred. "Void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles prepared by a technique disclosed in Japanese Patent Laid-Open No. 233611/2001. The void-containing silica fine particles can easily produced. Further, the hardness of the void-containing fine particles is high. Therefore, when a surface modifying layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the surface modifying layer.

2) High-Refractive Index Agent/Medium-Refractive Index Agent

The high-refractive index agent and the medium-refractive index agent may be added to the surface modifying layer to further improve antireflective properties. The refractive index of the high-refractive index agent and medium-refractive index agent may be set in a range of 1.46 to 2.00. The medium-refractive index agent has a refractive index in the range of 1.46 to 1.80, and the refractive index of the high-refractive index agent is in the range of 1.65 to 2.00.

These refractive index agents include fine particles, and specific examples thereof (the numerical value within the parentheses being a refractive index) include zinc oxide (1.90), titania (2.3 to 2.7), ceria (1.95), tin-doped indium oxide (1.95), antimony-doped tin oxide (1.80), yttria (1.87), and zirconia (2.0).

Leveling Agent

A leveling agent may be added to the surface modifying layer. Preferred leveling agents include fluorine-type or silicone-type leveling agents. The surface modifying layer to which the leveling agent has been added can realize a good coated face, can effectively prevent the inhibition of curing of the coating film surface by oxygen in coating or drying, and can impart a scratch resistance.

Contamination Preventive Agent

A contamination preventive agent may be added to the surface modifying layer. The contamination preventive agent is mainly used to prevent the contamination of the outermost surface of the optical laminate and can impart scratch resistance to the optical laminate. Specific examples of effective contamination preventive agents include additives which can develop water repellency, oil repellency, and fingerprint wiping-off properties. More specific examples of contamination preventive agents include fluorocompounds and silicon compounds or mixtures of these compounds. More specific examples thereof include fluoroalkyl group-containing silane coupling agents such as 2-perfluorooctylethyltriaminosilane. Among them, amino group-containing compounds are particularly preferred.

Resin

The surface modifying layer may comprises at least a surface modifying agent and a resin (including a resin component such as a monomer and an oligomer). When the surface modifying layer does not contain a surface modifying agent, the resin functions as a curability enhancing agent or functions to render the concavoconvexes of the anti-dazzling layer smooth.

The resin is preferably transparent, and specific examples thereof are classified into ionizing radiation curing resins which are curable upon exposure to ultraviolet light or electron beams, mixtures of ionizing radiation curing resins with solvent drying-type resins, or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl (meth)acrylate, ethylhexyl (meth)acrylate, styrene, methyl styrene, and N-vinylpyrrolidone, and polyfunctional monomers, for example, polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the ionizing radiation curing resin is an ultraviolet curing resin, a photopolymerization initiator is preferably used. Specific examples of photopolymerization initiators include acetophenones, benzophenones, Michler's benzoyl benzoate, α-amyloxime ester, and thioxanthones. Preferably, photosensitizers are mixed in the system. Specific examples of photosensitizers include n-butylamine, triethylamine, and poly-n-butylphosphine.

When ionizing radiation curing resins are used as an ultraviolet curing resin, a photopolymerization initiator or a photopolymerization accelerator may be added. In the case of a radical polymerizable unsaturated group-containing resin system, acetophenones, benzophenones, thioxanthones, benzoins, benzoin methyl ether and the like are used as a photopolymerization initiator either solely or as a mixture of two or more. On the other hand, in the case of a cation polymerizable functional group-containing resin system, aromatic diazonium salts, aromatic sulfonium salts, aromatic iodonium salts, metallocene compounds, benzoinsulfonic esters and the like may be used as a photopolymerization initiator either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Commonly exemplified thermoplastic resins are usable. Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, cellulose derivatives (for example, cellulose esters).

The coating film defect of the coated face can be effectively prevented by adding a solvent drying-type resin. In a preferred embodiment of the present invention, when the light transparent base material is formed of a cellulosic resin such as triacetylcellulose "TAC," examples of preferred thermoplastic resins include cellulosic resins, for example, nitrocellulose, acetylcellulose, cellulose acetate propionate, and ethylhydroxyethylcellulose.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Polymerization Initiator

In the formation of a surface modifying layer, photopolymerization initiators may be used. Specific examples thereof include 1-hydroxy-cyclohexyl-phenyl-ketone. This compound is commercially available, and examples of commercially available products include Irgacure 184 (tradename, manufactured by Ciba Specialty Chemicals, K.K.).

Solvent

A composition for a surface modifying layer comprising the above components mixed with the solvent is utilized for surface modifying layer formation. Specific examples of solvents usable herein include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixture thereof. Preferred are ketones and esters.

Method for Surface Modifying Layer Formation

The surface modifying layer may be formed by applying a composition for a surface modifying layer onto the anti-dazzling layer. The composition for a surface modifying layer may be formed by coating methods such as roll coating, Mayor bar coating, or gravure coating. After coating of the composition for a surface modifying layer, the coating is dried and cured by ultraviolet light irradiation. Specific examples of ultraviolet light sources include ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators.

Optional Layers

The optical laminate according to the present invention comprises a light transparent base material, an anti-dazzling layer, and an optional surface modifying layer. Optional layers such as an antistatic layer, a low-refractive index layer, and a contamination preventive layer may be further provided. The low-refractive index layer preferably has a lower refractive index than the refractive index of the anti-dazzling layer or surface modifying layer. The antistatic layer, low-refractive index layer, and contamination preventive layer may be formed by using a composition prepared by mixing a resin and the like with an antistatic agent, a low-refractive index agent, a contamination preventive agent or the like as described above in connection with the surface modifying layer. Accordingly, the antistatic agent, low-refractive index agent, contamination preventive agent, resin and the like may be the same as those used in the formation of the surface modifying layer.

4. Light Transparent Base Material

The light transparent base material is preferably smooth and possesses excellent heat resistance and mechanical strength. Specific examples of materials usable for the light transparent base material formation include thermoplastic resins, for example, polyesters (polyethylene terephthalate and polyethylene naphthalate), cellulose triacetate, cellulose diacetate, cellulose acetatebutyrate, polyamide, polyimide, polyethersulfone, polysulfone, polypropylene, polymethylpentene, polyvinyl chloride, polyvinylacetal, polyether ketone, polymethyl methacrylate, polycarbonate, and polyurethane. Preferred are polyesters (polyethylene terephthalate and polyethylene naphthalate) and cellulose triacetate. Films of amorphous olefin polymers (cycloolefin polymers: COPs) having an alicyclic structure may also be mentioned as other examples of the light transparent base material. These films are base materials using nobornene polymers, monocyclic olefinic polymers, cyclic conjugated diene polymers, vinyl alicyclic hydrocarbon polymer resins and the like, and examples thereof include Zeonex and ZEONOR, manufactured by Zeon Corporation (norbornene resins), Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optlet OZ-1000 series (alicyclic acrylic resins) manufactured by Hitachi Chemical Co., Ltd. Further, FV series (low birefringent index and low photoelastic films) manufactured by Asahi Kasei Chemicals Corporation are also preferred as base materials alternative to triacetylcellulose.

In the present invention, preferably, these thermoplastic resins are used as a highly flexible thin film. Depending upon the form of use where curability are required, plate-like materials such as plates of these thermoplastic resins or glass plates are also usable.

The thickness of the light transparent base material is not less than 20 μm and not more than 300 μm. Preferably, the upper limit of the thickness is 200 μm, and the lower limit of the thickness is 30 μm. When the light transparent base material is a plate-like material, the thickness may be above the upper limit of the above-defined thickness range. In forming an anti-dazzling layer on the light transparent base material, the base material may be previously subjected to physical treatment such as corona discharge treatment or oxidation treatment or may be previously coated with an anchoring agent or a coating material known as a primer from the viewpoint of improving the adhesion.

Utilization of Optical Laminate

The optical laminate produced by the process according to the present invention may be used in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from the anti-dazzling layer faces the surface of the polarizing element.

The polarizing element may comprise, for example, polyvinyl alcohol films, polyvinylformal films, polyvinylacetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

In a further embodiment of the present invention, there is provided an image display device. The image display device comprises a transmission display and a light source device for applying light to the transmission display from its back side. The optical laminate according to the present invention or the polarizing plate according to the present invention is provided on the surface of the transmission display. The image display device according to the present invention may basically comprise a light source device (backlight), a display element, and the optical laminate according to the present invention. The image display device is utilized in transmission display devices, particularly in displays of televisions, computers, word processors and the like. Among others, the image display device is used on the surface of displays for high-definition images such as CRTs and liquid crystal panels.

When the image display device according to the present invention is a liquid crystal display device, light emitted from the light source device is applied through the lower side of the optical laminate according to the present invention. In STN-type liquid crystal display devices, a phase difference plate may be inserted into between the liquid crystal display element and the polarizing plate. If necessary, an adhesive layer may be provided between individual layers in the liquid crystal display device.

EXAMPLES

The following embodiments further illustrate the present invention. However, it should be noted that the contents of the present invention are not limited by these embodiments. The "parts" and "%" are by mass unless otherwise specified.

Compositions for respective layers constituting an optical laminate were prepared according to the following formulations. The formulations are summarized in Table 1.

Preparation of Composition for Anti-Dazzling Layer

Composition 1 for Anti-Dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 5.0 μm, refractive index 1.53) as light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 1 for an anti-dazzling layer.

Composition 2 for Anti-Dazzling Layer

Composition 2 for an anti-dazzling layer was prepared in the same manner as in the composition 1 for an anti-dazzling layer, except that the light transparent fine particles were changed to monodisperse acrylic beads having a particle diameter of 9.5 μm (manufactured by Nippon Shokubai Kagaku Kogyo Co., Ltd., refractive index 1.53).

Composition 3 for Anti-Dazzling Layer

Composition 3 for an anti-dazzling layer was prepared in the same manner as in the composition 1 for an anti-dazzling layer, except that the light transparent fine particles were changed to monodisperse acrylic beads having a particle diameter of 13.5 μm (manufactured by Nippon Shokubai Kagaku Kogyo Co., Ltd., refractive index 1.53).

Composition 4 for Anti-Dazzling Layer

Pentaerythritol triacrylate (PETA) (manufactured by Nippon Kayaku Co., Ltd., refractive index 1.51) (21.08 parts by mass) as an ultraviolet curing resin, 10.33 parts by mass of DPHA (manufactured by Nippon Kayaku Co., Ltd., refractive index 1.51) as an ultraviolet curing resin, 3.24 parts by mass of an acrylic polymer (manufactured by Mitsubishi Rayon Co., Ltd., molecular weight 75,000) as an ultraviolet curing resin, 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 3.47 parts by mass of monodisperse acrylic beads (manufactured by Nippon Shokubai Kagaku Kogyo Co., Ltd., particle diameter 13.5 μm, refractive index 1.53) as light transparent fine particles, 0.014 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 4 for an anti-dazzling layer.

Composition 5 for Anti-Dazzling Layer

Pentaerythritol triacrylate (PETA) (manufactured by Nippon Kayaku Co., Ltd., refractive index 1.51) (21.88 parts by mass) as an ultraviolet curing resin, 12.03 parts by mass of DPHA (manufactured by Nippon Kayaku Co., Ltd., refractive index 1.51) as an ultraviolet curing resin, 3.46 parts by mass of an acrylic polymer (manufactured by Mitsubishi Rayon Co., Ltd., molecular weight 75,000) as an ultraviolet curing resin, 2.19 parts by mass of Irgacure 184 (manufactured by Ciba-Geigy Limited) as a photocuring initiator, 0.37 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 9.5 μm, refractive index 1.53) as light transparent fine particles, 0.015 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 5 for an anti-dazzling layer.

Composition 6 for Anti-Dazzling Layer

Composition 6 for an anti-dazzling layer was prepared in the same manner as in the composition 1 for an anti-dazzling layer, except that the light transparent fine particles were changed to acrylic beads having a particle size distribution of 5.0 μm in terms of particle diameter (manufactured by Nippon Shokubai Kagaku Kogyo Co., Ltd., refractive index 1.53).

Composition 7 for Anti-Dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 4.80 parts by mass of monodisperse acrylic beads (manufactured by Nippon Shokubai Kagaku Kogyo Co., Ltd., particle diameter 9.5 μm, refractive index 1.53) as first light transparent fine particles, 1.59 parts by mass of monodisperse acrylic beads (manufactured by Nippon Shokubai Kagaku Kogyo Co., Ltd., particle diameter 9.5 μm, refractive index 1.53) as second light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 7 for an anti-dazzling layer.

Composition 8 for Anti-Dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.18 parts by mass of an acrylic polymer (manufactured by Mitsubishi Rayon Co., Ltd., molecular weight 75,000) as an ultraviolet curing resin, 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 4.96 parts by mass of acrylic beads (manufactured by Nippon Shokubai Kagaku Kogyo Co., Ltd., particle diameter 4.6 μm, refractive index 1.53) as first light transparent fine particles, 1.65 parts by mass of acrylic beads (manufactured by Nippon Shokubai Kagaku Kogyo Co., Ltd., particle diameter 3.5 μm, refractive index 1.53) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition 8 for an anti-dazzling layer.

Composition 9 for Anti-Dazzling Layer

EXG40-77 (V-15M) (amorphous silica ink, average particle diameter of silica 2.5 Kim, solid content 60%, manufactured by Dainichiseika Color & Chemicals Manufacturing Co., Ltd.) (1.77 g) as an amorphous silica matting agent ink for an anti-dazzling layer, pentaerythritol triacrylate (PETA) (manufactured by Nippon Kayaku Co., Ltd., refractive index 1.51) (2.93 g) as an ultraviolet curing resin, 0.37 g of an acrylic polymer (manufactured by Mitsubishi Rayon Co., Ltd., molecular weight 40,000) as an ultraviolet curing resin, 0.17 g of Irgacure 184 (manufactured by Ciba-Geigy Limited) as a photocuring initiator, 0.6 g of Irgacure 907 (manufactured by Ciba-Geigy Limited) as a photocuring initiator, 0.043 g of a silicone leveling agent 10-28 (manufactured by The Inctec Inc.), 7.8 g of toluene, and 1.0 g of MIBK (methyl isobutyl ketone) were thoroughly mixed together to prepare a composition. This composition was filtered through a polypropylene filter having a pore diameter of 80 μm to prepare composition 9 for an anti-dazzling layer.

Preparation of Composition for Surface Modifying Layer

DPHA (manufactured by Nippon Kayaku Co., Ltd., refractive index 1.51) (39.30 parts by mass) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition 1 for a surface modifying layer.

Composition 2 for Surface Modifying Layer

C-4456 S-7 (an ATO-containing electroconductive ink, average particle diameter of ATO 300 to 400 nm, solid content 45%, manufactured by NIPPON PELNOX CORP.) (21.6 g) as a material for an antistatic layer, 28.69 g of DPHA (manufactured by Nippon Kayaku Co., Ltd., refractive index 1.51) as an ultraviolet curing resin, 1.56 g of Irgacure 184 (manufactured by Ciba-Geigy Limited) as a photocuring initiator, 33.7 g of MIBK (methyl isobutyl ketone), and 14.4 g of cyclohexanone were thoroughly mixed together to prepare a composition. This composition was filtered through a polypropylene filter having a pore diameter of 30 μm to prepare composition 2 for a surface modifying layer.

Composition 3 for Surface Modifying Layer

Composition 3 for a surface modifying layer having the following formulation was prepared using a zirconia-containing coating composition (tradename; "KZ 7973", a resin matrix having a refractive index of 1.69, solid content 50%, manufactured by JSR) so that the resin matrix had a refractive index of 1.60.

Pentaerythritol triacrylate (PETA) (manufactured by Nippon Kayaku Co., Ltd., refractive index 1.51) (18.59 parts by mass) as an ultraviolet curing resin, 17.18 parts by mass of zirconia (zirconia contained in "KZ 7973" (tradename), average particle diameter 40 to 60 nm, refractive index 2.0, manufactured by JSR) for incorporation in an ultraviolet curing resin to develop a resin matrix, 1.22 parts by mass of a zirconia dispersant (a zirconia dispersion stabilizer contained in "KZ 7973" (tradename), manufactured by JSR), 0.94 part by mass of an acrylic polymer (manufactured by Mitsubishi Rayon Co., Ltd., molecular weight 40,000) as an ultraviolet curing resin, 1.56 parts by mass of Irgacure 184 (manufactured by Ciba-Geigy Limited) as a photocuring initiator, 0.26 part by mass of Irgacure 907 (manufactured by Ciba-Geigy Limited) as a photocuring initiator, 0.039 part by mass of a silicone leveling agent 10-28 (manufactured by The Inctec Inc.), 14.34 parts by mass of toluene, 15.76 parts by mass of cyclohexanone, and 2.80 parts by mass of MEK were thoroughly mixed together to prepare a composition. This composition was filtered through a polypropylene filter having a pore diameter of 30 μm to prepare composition 3 for a surface modifying layer.

Preparation of Composition for Low-Refractive Index Layer

Composition 1 for Low-Refractive Index Layer

A photopolymerization initiator (tradename; "JUA701," manufactured by JSR) (0.85 g) and 65 g of MIBK were added to 34.14 g of a fluororesin composition (tradename; "TM086", manufactured by JSR), and the mixture was stirred and was filtered through a polypropylene filter having a pore diameter of 10 μm to prepare composition for a low-refractive index layer.

Composition 2 for Low-Refractive Index Layer

The following components were stirred according to the following formulation, and the mixture was filtered through a polypropylene filter having a pore diameter of 10 μm to prepare composition 2 for a low-refractive index layer.

| | |
|---|---|
| Surface treated silica sol (void-containing fine particles) (as 20% methyl isobutyl ketone solution) | 14.3 pts. wt. |
| Pentaerythritol triacrylate (PETA, refractive index 1.51, manufactured by Nippon Kayaku Co., Ltd.) | 1.95 pts. wt. |
| Irgacure 907 (manufactured by Ciba Specialty Chemicals, K.K.) | 0.1 pt. wt. |
| Polyether-modified silicone oil TSF4460 (tradename, manufactured by GE Toshiba Silicone Co., Ltd.) | 0.15 pt. wt. |
| Methyl isobutyl ketone | 83.5 pts. wt. |

Preparation of Composition for Antistatic Layer

C-4456 S-7 (an ATO-containing electroconductive ink, average particle diameter of ATO 300 to 400 nm, solid content 45%, manufactured by NIPPON PELNOX CORP.) (2.0 g) was provided as a material for an antistatic layer. Methyl isobutyl ketone (2.84 g) and 1.22 g of cyclohexanone were added to the material, and the mixture was stirred and was filtered through a polypropylene filter having a pore diameter of 30 μm to prepare composition for an antistatic layer.

Production of Optical Laminate

Example 1

An optical laminate according to the present invention was produced as follows to produce an optical laminate (HG1).

Formation of Anti-Dazzling Layer

An 80 μm-thick triacetylcellulose film (TD80U, manufactured by Fuji Photo Film Co., Ltd.) was provided as a transparent base material. Composition 1 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 5 μm-thick anti-dazzling hardcoat layer was formed. The light transparent fine particles were monodisperse acrylic beads having a particle diameter of 5.0 μm.

Formation of Surface Modifying Layer

Composition 1 for a surface modifying layer was coated onto the anti-dazzling layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick surface modifying layer was formed.

Example 2

An optical laminate (HG2) was produced in the same manner as in Example 1, except that composition 2 for an anti-dazzling layer was used. The light transparent fine particles in composition 2 for an anti-dazzling layer were monodisperse acrylic beads having a particle diameter of 9.5 μm, and the surface modifying layer had a thickness of 4.0 μm.

Example 3

An optical laminate (HG3) was produced in the same manner as in Example 1, except that composition 3 for an anti-dazzling layer was used. The light transparent fine particles in composition 3 for an anti-dazzling layer were monodisperse acrylic beads having a particle diameter of 13.5 μm.

Example 4

An optical laminate was produced in the same manner as in Example 1, except that composition 4 for an anti-dazzling layer was used. The light transparent fine particles in composition 4 for an anti-dazzling layer were monodisperse acrylic beads having a particle diameter of 13.5 μm, and the proportion of the light transparent fine particles to the total weight of the solid content was ½ in the case of Example 3.

Example 5

An optical laminate was produced in the same manner as in Example 1, except that composition 5 for an anti-dazzling layer was used. The light transparent fine particles in composition 5 for an anti-dazzling layer were monodisperse acrylic beads having a particle diameter of 9.5 μm, and the proportion of the light transparent fine particles to the total weight of the solid content was 75/1000 in the case of Example 2.

Example 6

An optical laminate was produced in the same manner as in Example 1, except that composition 6 for an anti-dazzling layer was used. The light transparent fine particles in composition 6 for an anti-dazzling layer were acrylic beads having a particle size distribution of 5.0 μm.

Example 7

An optical laminate was produced in the same manner as in Example 1, except that composition 7 for an anti-dazzling layer was used. The first light transparent fine particles in composition 7 for an anti-dazzling layer were monodisperse acrylic beads having a particle diameter of 9.5 μm, and the second light transparent fine particle were monodisperse acrylic beads having a particle diameter of 5.0 μm.

Example 8

An optical laminate was produced in the same manner as in Example 1, except that composition 4 for an anti-dazzling layer and composition 2 for a surface modifying layer were used. In order to form an electroconductive surface modifying layer, an ATO-containing composition was used in composition 2 for a surface modifying layer. The optical laminate had an electrical surface resistance value of $2.0 \times 10^{12} \Omega/\square$.

Example 9

An optical laminate according to the present invention was produced as follows to produce an optical laminate.

Formation of Antistatic Layer

An 80 μm-thick triacetylcellulose film (TD80U, manufactured by Fuji Photo Film Co., Ltd.) was provided as a light transparent base material. The composition for an antistatic layer was coated onto the light transparent base material with a wire-wound rod for coating (Mayer's bar), and the coated light transparent base material was heat dried in an oven of 50° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 1 μm-thick antistatic layer was formed.

Formation of Anti-Dazzling Layer

Composition 4 for an anti-dazzling layer was coated onto the antistatic layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 3 μm-thick anti-dazzling layer was formed.

Formation of Surface Modifying Layer

Composition 1 for a surface modifying layer was coated onto the anti-dazzling layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick surface modifying layer was formed to produce an optical laminate. The electrical surface resistance value of the optical laminate was $3.2 \times 10^{12} \Omega/\square$.

Example 10

An optical laminate according to the present invention was produced as follows. An anti-dazzling layer was formed in the same manner as in Example 1, except that, in forming an anti-dazzling layer, composition 4 for an anti-dazzling layer was used. Further, a surface modifying layer was formed in the same manner as in Example 1, except that ultraviolet light was applied at an exposure of 30 mJ for half curing to cure the coating film.

Formation of Low-Refractive Index Layer

Composition 2 for a low-refractive index layer was coated onto the anti-dazzling layer with a wire-wound rod for coating (Mayer's bar), and the coating was heat dried in an oven of 50° C. for one min to evaporate the solvent component. Thereafter, under nitrogen purge (oxygen concentration: not more than 200 ppm), ultraviolet light was applied at an exposure of 150 mJ to cure the coating film. Thus, a 98 μm-thick surface modifying layer was formed to produce an optical laminate.

Example 11

An optical laminate according to the present invention produced as follows. An optical laminate was produced in the same manner as in Example 10, except that, in forming a surface modifying layer, composition 3 for a surface modifying layer and composition 1 for a low-refractive index layer were used. A zirconia-containing resin matrix was used in composition 3 for a surface modifying layer, and the refractive index of the surface modifying layer was regulated to 1.60.

Example 12

Embossing Method

Preparation of Emboss Roller

An iron roller was provided. 100-mesh (particle size distribution; 106 μm to 150 μm) glass beads were shot against the surface of the roller to form concavoconcaves. The concavoconvex face was plated with chromium to a thickness of 5 μm to prepare an emboss roller. In bead shot blasting, blasting pressure, the spacing between the blasting nozzle and the roller and the like were regulated to prepare an emboss roller which corresponds to optical characteristics of the concavoconvex shape in the anti-dazzling layer provided in the optical laminate according to the present invention.

Preparation of Composition for Anti-Dazzling Layer

A composition prepared by mixing a polyurethane resin primer coating material (a medium main agent for chemical mat varnish, curing agent (XEL curing agent (D), manufactured by The Inctec Inc.) in a mass ratio of main agent to curing agent to solvent of 10:1:3.3 was gravure coated, and the coating was dried to form a 3 μm-thick primer layer. The solvent used was a mixed solvent composed of toluene and methyl ethyl ketone in a ratio of 1:1.

Production of Optical Laminate

A fourth production apparatus (an embossing apparatus 40) according to the present invention is shown in FIG. 6. The emboss roller prepared above was mounted on the embossing apparatus, and the composition for an anti-dazzling layer was supplied into a liquid reservoir in a coating head. An 80 μm-thick polyethylene terephthalate resin film (the stock number; A4300, manufactured by Toyobo Co., Ltd.) was provided and supplied to the emboss roller. The composition for an anti-dazzling layer was coated onto the emboss roller and was then applied onto the polyethylene terephthalate film. Subsequently, ultraviolet light from an ultraviolet light source (D-bulb, manufactured by Fusion) was applied to the coating from the film side, and the assembly was then separated to produce an optical laminate according to the present invention.

Comparative Example 1

A conventional anti-dazzling optical laminate was prepared as follows to produce an optical laminate (AG1). Specifically, an 80 μm-thick triacetylcellulose film (TD80U, manufactured by Fuji Photo Film Co., Ltd.) was provided as a transparent base material. Composition 8 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 6 μm-thick anti-dazzling hardcoat layer was formed. AG1 is an anti-dazzling optical laminate (AG1) of a mixed particle system using 4.96 parts by mass of acrylic beads (manufactured by Nippon Shokubai Kagaku Kogyo Co., Ltd., particle diameter 4.6 μm, refractive index 1.53) as first light transparent fine particles and 1.65 parts by mass of acrylic beads (manufactured by Nippon Shokubai Kagaku Kogyo Co., Ltd., particle diameter 3.5 μm, refractive index 1.53) as second light transparent fine particles.

Comparative Example 2

A conventional anti-dazzling optical laminate was produced as follows to produce an optical laminate. Specifically, the procedure of Comparative Example 1 was repeated, except that composition 9 for an anti-dazzling layer was used and the thickness of the anti-dazzling layer was 3 μm. The optical laminate of Comparative Example 2 is an anti-dazzling optical laminate (AG) using amorphous silica.

Evaluation Test

Figure 7:
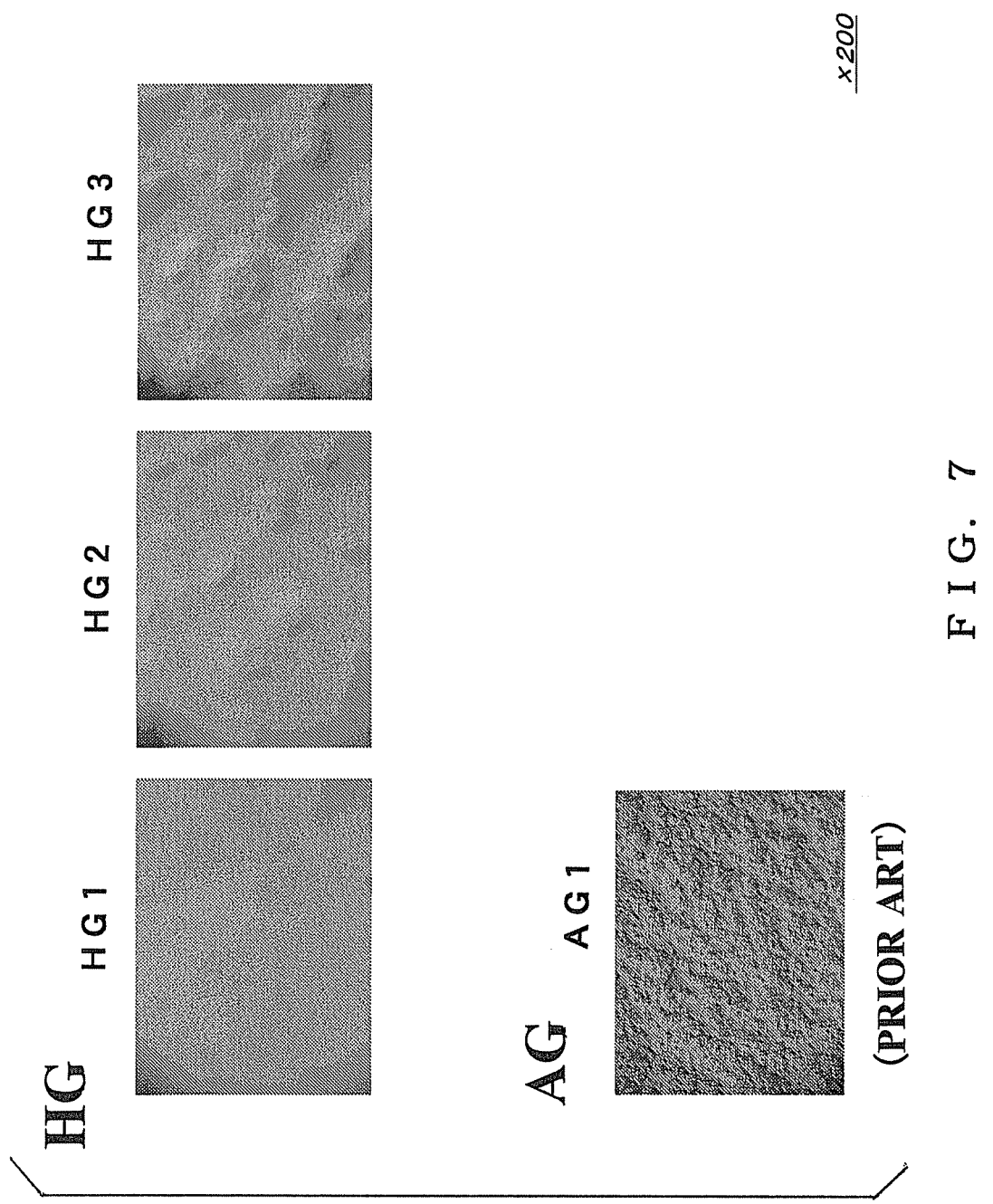
FIG. 7 is an optical photomicrograph of a surface shape of each of an optical laminate according to the present invention and a conventional anti-dazzling optical laminate.
Figure 8:
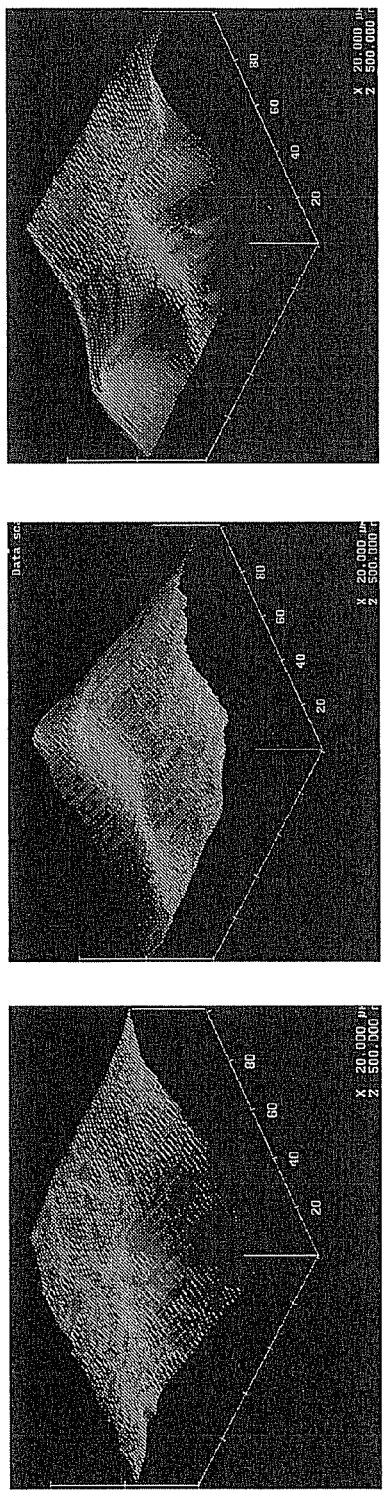
FIG. 8 is a photograph of an optical laminate according to the present invention taken by three-dimensional measurement under AFN.
Figure 8:
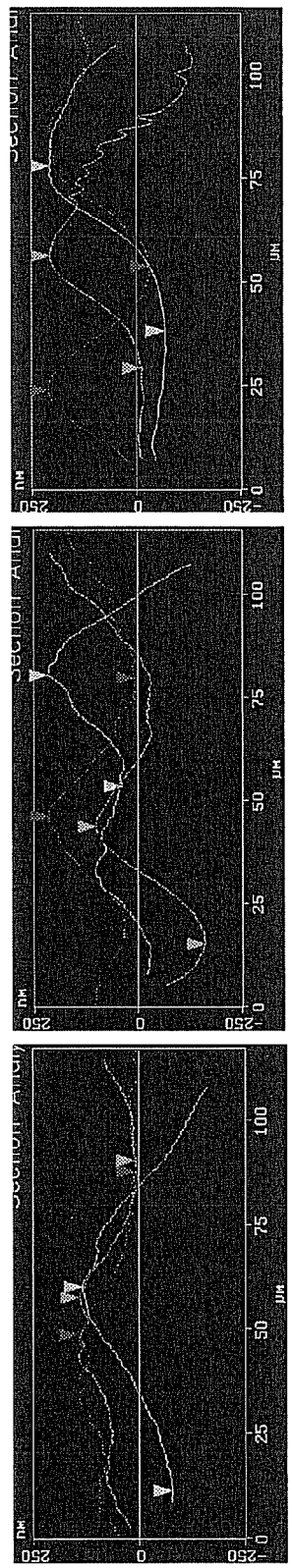
Figure 9:
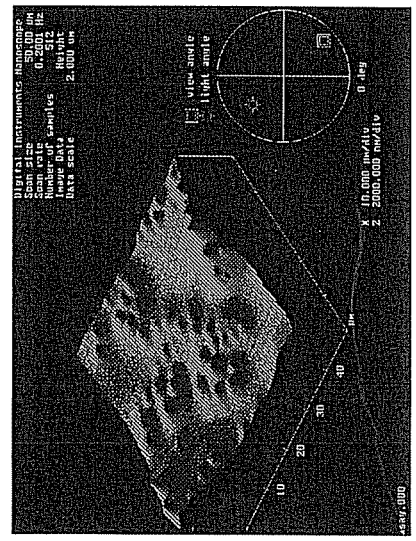
FIG. 9 is a photograph of a conventional optical laminate taken by three-dimensional measurement under AFN.
Figure 9:
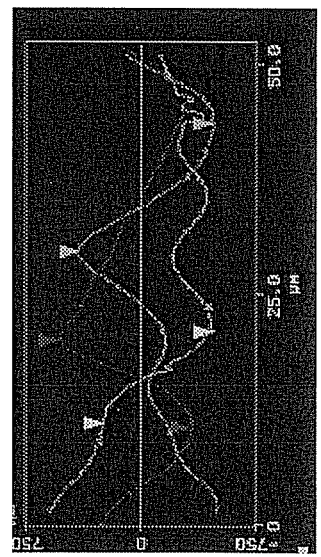

The following evaluation tests were carried out. The results are shown in FIGS. 7 to 9 and Table 1 (results of evaluations 3 to 6).

Evaluation 1: Planar Shape Evaluation Test

Each of the optical laminates of Example and Comparative Example was mounted on a panel of an image display device, and the surface shape was photographed with an optical microscope (tradename; BX60-F3, manufactured by OLYMPUS; 200 times). The results were as shown in FIG. 7. As can be seen from FIG. 7, for HG1 to HG3 which are optical laminates according to the present invention, the waviness of the concavoconvex shape was smooth, the concavoconvex shape is not sharp, and the whole surface is in the form of a plurality of very gently sloping hills. On the other hand, for AG1 which is a conventional anti-dazzling optical laminate, the surface is rough like an enlarged photograph of the human skin, and the concavoconvex shape is sharp.

Evaluation 2: Three-Dimensionality Evaluation Test for Concavoconvex Shape

Each of the optical laminates of Example and Comparative Example was mounted on a panel of an image display device, and the surface shape was photographed with AFM (tradename: a scanning probe microscope). The results were as shown in FIGS. 8 and 9. As can be seen from FIG. 8, for HG1 to HG3 which are optical laminates according to the present invention, the waviness of the concavoconvex shape was very smooth, the concavoconvex shape is not sharp, and the whole surface is in the form of a plurality of very gently sloping hills. On the other hand, as can be seen from FIG. 9, for AG1 which is a conventional anti-dazzling optical laminate, the surface is in the form of a number of sharp concavoconvex shapes.

Evaluation 3: Optical Characteristics Test

For the optical laminates of Example and Comparative Example, the haze value (%), 60-degree gloss, Sm, θa, Rz, reflection Y value (5-degree reflection), and electrical surface resistance were measured according to the definition described in the present specification. The results were as shown in Table 1.

Evaluation 4: Glossy Black Feeling Test

A crossed Nicol polarizing plate was applied onto each of the optical laminates of Example and Comparative Example on its side remote from the film. Sensory evaluation was carried out under three-wavelength fluorescence, and glossy black feeling (reproduction of glossy black) was evaluated in detail according to the following criteria.

Evaluation Criteria

○: Glossy black could be reproduced.

Δ: Glossy black could be somewhat reproduced but was unsatisfactory as a product.

x: Glossy back could not be reproduced.

Evaluation 5: Glare Test

A black matrix pattern plate (105 ppi) formed on a 0.7 mm-thick glass was placed on a viewer manufactured by HAKUBA (light viewer 7000PRO) so that the pattern surface faced downward. The optical laminate film prepared above was placed thereon so that the concavoconvex face was on the air side. Glare was visually observed in a dark room while lightly pressing with a finger the edge of the film to prevent the lift of the film, and the results were evaluated.

Evaluation Criteria

○: No glare was observed at 105 ppi, and the antiglareness was good.

x: Glare was observed at 105 ppi, and the antiglareness was poor.

Evaluation 6: Anti-Dazzling Evaluation Test

A black acrylic plate was applied onto the backside of the optical laminate with the aid of an optical pressure-sensitive adhesive. The sample was placed on a horizontal desk. White fluorescent lamps (32 W×2 lamps) were disposed 2.5 m above the desk. Reflection of the edge part of the white fluorescent lamps was visually observed and was evaluated.

Evaluation Criteria

○: The edge was not reflected, and the anti-dazzling property was good.

x: The edge was reflected, and the anti-dazzling property was poor.

TABLE 1

| | Composition for anti-dazzling layer | | | | | |
|---|---|---|---|---|---|---|
| | Light transparent fine particles | | | Binder | | Solvent composition |
| | Particle diameter | Material | Weight ratio per unit area between resin and particle | Addition amount of polymer (based on binder) | Monomer ratio | (Ratio of toluene to coating composition component) |
| Ex. 1 | 5.0 μm | PMMA | 0.20 | PMMA polymer 10 wt % (mw 75000) | PETA:DPHA = 65:35 wt % | Toluene:cyclohexanone = 80:20 wt % (40.5 wet %) |
| Ex. 2 | 9.5 μm | ↓ | ↓ | ↓ | ↓ | ↓ |
| Ex. 3 | 13.5 μm | ↓ | ↓ | ↓ | ↓ | ↓ |
| Ex. 4 | 13.5 μm | ↓ | 0.10 | ↓ | ↓ | ↓ |
| Ex. 5 | 9.5 μm | ↓ | 0.015 | ↓ | ↓ | ↓ |
| Ex. 6 | 5.0 ± 2.0 (particle size distribution) | ↓ | 0.20 | ↓ | ↓ | ↓ |
| Ex. 7 | 9.5 μm 5.0 μm Mixed particle system | ↓ | 0.20 (9.5 μm...0.15 5.0 μm...0.05) | ↓ | ↓ | ↓ |
| Ex. 8 | 13.5 μm | ↓ | 0.10 | ↓ | ↓ | ↓ |
| Ex. 9 | ↓ | ↓ | ↓ | ↓ | ↓ | ↓ |
| Ex. 10 | ↓ | ↓ | ↓ | ↓ | ↓ | ↓ |

TABLE 1-continued

| | | | | | | |
|---|---|---|---|---|---|---|
| Ex. 11 | ↓ | ↓ | ↓ | ↓ | ↓ | ↓ |
| Ex. 12 | | Concavo-convex formation by embossing (embossing treatment) | | | | |
| Comp. Ex. 1 | 4.6 μm 3.5 μm Mixed particle system | ↓ | 0.18 | ↓ | ↓ | ↓ |
| Comp. Ex. 2 | Average particle diameter 2.5 μm Amorphous silica | Silica | 0.00 | PMMA polymer 1.25 wt % (mw 45000) | PETA = 100 | Toluene:MIBK = 90:10 wt % (40.5 wet %) |

| | Evaluation 3 | | | | | | | |
|---|---|---|---|---|---|---|---|---|
| | Haze (%) | 50-degree gloss | Sm | θa | Rz | Reflection Y value (5-degree reflection) | Evaluation 4 | Evaluation 5 | Evaluation 6 |
| Ex. 1 | 0.3 | 98.7 | 233.1 | 0.384 | 0.606 | — (* No low-refractive index layer: 4%) | ○ | ○ | ○ |
| Ex. 2 | 0.4 | 94.6 | 170.2 | 0.504 | 0.663 | — | ○ | ○ | ○ |
| Ex. 3 | 0.6 | 90.3 | 362.5 | 0.539 | 1.040 | — | ○ | ○ | ○ |
| Ex. 4 | 0.5 | 92.3 | 354.1 | 0.478 | 0.833 | — | ○ | ○ | ○ |
| Ex. 5 | 0.4 | 94.8 | 375.1 | 0.422 | 0.482 | — | ○ | ○ | ○ |
| Ex. 6 | 0.4 | 93.2 | 192.3 | 0.521 | 0.834 | — | ○ | ○ | ○ |
| Ex. 7 | 0.5 | 94.9 | 201.3 | 0.532 | 0.743 | — | ○ | ○ | ○ |
| Ex. 8 | 1.4 | 93.2 | 323.1 | 0.912 | 0.893 | — | ○ | ○ | ○ |
| Ex. 9 | 1.8 | 93.1 | 367.3 | 0.623 | 0.982 | — | ○ | ○ | ○ |
| Ex. 10 | 0.5 | 65.3 | 392.3 | 0.432 | 0.732 | 1.8% | ○ | ○ | ○ |
| Ex. 11 | 1.3 | 56.2 | 245.3 | 0.392 | 0.652 | 1.4% | ○ | ○ | ○ |
| Ex. 12 | 1.9 | 70.3 | 102.2 | 0.493 | 0.832 | — | ○ | ○ | ○ |
| Comp. Ex. 1 | 4.7 | 48.2 | 93.2 | 1.892 | 1.439 | — | X | X | ○ |
| Comp. Ex. 2 | 3.8 | 65.0 | 267.2 | 1.857 | 1.932 | — | X | ○ | X |

The invention claimed is:

1. A process for producing an optical laminate of a display comprising a light transparent base material and an anti-dazzling layer provided on the light transparent base material, comprising the steps of:
   providing the light transparent base material; and
   forming the anti-dazzling layer on the light transparent base material, the anti-dazzling layer having a surface of a concavoconvex shape;
   wherein the surface of the anti-dazzling layer is a surface of the optical laminate;
   wherein the concavoconvex shape of the anti-dazzling layer satisfies the requirements that Sm is not less than 100 μm and not more than 600 μm, θa is not less than 0.1 degree and not more than 1.2 degrees, and Rz is not less than 0.482 μm and not more than 1.2 μm;
   wherein Sm represents the average spacing of concavoconvexes in the anti-dazzling layer, θa represents the average inclination angle of the concavoconvexes, Rz represents the average roughness of the concavoconvexes, and wherein measuring conditions of the concavoconvex shape are based on a reference length, which is a cut-off value of a roughness curve λc, of 2.5 mm; and
   wherein said optical laminate has a surface haze value of 0.2% or more and 1.9% or less.

2. The process according to claim 1, wherein the step of forming the anti-dazzling layer comprises forming an anti-dazzling layer with a concavoconvex shape previously formed therein on the light transparent base material.

3. The process according to claim 1, wherein the step of forming the anti-dazzling layer comprises forming an anti-dazzling layer on the light transparent base material and forming concavoconvexes on the surface of the anti-dazzling layer.

4. The process according to claim 3, wherein the step of forming the concavoconvexes comprises embossing treatment using a mold having a reversed concavoconvex shape in relation to the concavoconvex shape in the anti-dazzling layer.

5. The process according to claim 1, wherein the step of forming the anti-dazzling layer comprises applying a composition for an anti-dazzling layer onto the light transparent base material to form an anti-dazzling layer having the concavoconvex shape.

6. The process according to claim 5, wherein the composition for an anti-dazzling layer comprises a resin and fine particles.

7. The process according to claim 6, wherein the fine particles are aggregation-type fine particles.

8. The process according to claim 7, wherein the aggregation-type fine particles are a plurality of types of fine particles which are identical to or different from each other in average particle diameter.

9. The process according to claim 5, wherein the composition for an anti-dazzling layer does not contain fine particles and comprises a mixture of at least one polymer with at least one curable resin precursor.

10. The process according to claim 1, wherein the formation of the anti-dazzling layer is further followed by the formation of a surface modifying layer on the surface of the concavoconvex shape of the anti-dazzling layer.

11. The process according to claim 1, wherein Rz is not less than 0.482 μm and not more than 1.0 μm.

12. The process according to claim 1, wherein a reflection Y optical laminate value is not less than 0.5 and not more than 4.5.

13. The process according to claim 1, further comprising:
measuring an overall haze value of the anti-dazzling layer;
coating the concavoconvex shape of the anti-dazzling layer to render surface concavoconvexes flat:
measuring an internal haze value of the anti-dazzling layer; and
determining the surface haze value by subtracting the internal haze value from the overall haze value.

14. A process for producing an optical laminate of a display comprising a light transparent base material, an anti-dazzling layer and a surface modifying layer provided in that order on the light transparent base material, comprising the steps of:
provideing the light transparent base material;
forming the anti-dazzling layer on the light transparent base material, the anti-dazzling layer having a surface of a concavoconvex shape; and
forming the surface modifying layer on the anti-dazzling layer after forming the anti-dazzling layer, the surface modifying layer having a surface of a concavoconvex shape;
wherein the surface of the surface modifying layer is a surface of the optical laminate;
wherein the concavoconvex shape of the surface modifying layer satisfies the requirements that Sm is not less than 100 μm and not more than 600 μm, θa is not less than 0.1 degree and not more than 1.2 degrees, and Rz is not less than 0.482 μm and not more than 1.2 μm; and
wherein Sm represents the average spacing of concavoconvexes in the surface modifying layer, θa represents the average inclination angle of the concavoconvexes, Rz represents the average roughness of the concavoconvexes, and wherein measuring conditions of the concavoconvex shape are based on a reference length, which is a cut-off value of a roughness curve λc, of 2.5 mm.

15. A process for producing an optical laminate of a display comprising a light transparent base material, an anti-dazzling layer and a low-refractive index layer having a lower refractive index than the refractive index of the anti-dazzling layer provided in that order on the light transparent base material, comprising the steps of:
providing the light transparent base material;
forming the anti-dazzling layer on the light transparent base material, the anti-dazzling layer having a surface of a concavoconvex shape; and
forming the low-refractive index layer on the anti-dazzling layer after forming the anti-dazzling layer, the low-refractive index layer having a surface of a concavoconvex shape;
wherein the surface of the low-refractive index layer is a surface of the optical laminate;
wherein the concavoconvex shape of the low-refractive index layer satisfies the requirements that Sm is not less than 100 μm and not more than 600 μm, θa is not less than 0.1 degree and not more than 1.2 degrees, and Rz is not less than 0.482 μm and not more than 1.2 μm; and
wherein Sm represents the average spacing of concavoconvexes in the low-refractive index layer, θa represents the average inclination angle of the concavoconvexes, Rz represents the average roughness of the concavoconvexes, and wherein measuring conditions of the concavoconvex shape are based on a reference length, which is a cut-off value of a roughness curve λc, of 2.5 mm.

* * * * *